(12) United States Patent
Leung et al.

(10) Patent No.: US 10,404,840 B1
(45) Date of Patent: *Sep. 3, 2019

(54) INGESTING STREAMING SIGNALS

(71) Applicant: Banjo, Inc., Park City, UT (US)

(72) Inventors: KW Justin Leung, Redwood City, CA (US); Michael Avner Urbach, Redwood City, CA (US); Armando Guereca-Pinuelas, Redwood City, CA (US); Christopher E. Latko, Redwood City, UT (US); Damien Patton, Park City, UT (US); Rish Mehta, Redwood City, CA (US)

(73) Assignee: Banjo, Inc., Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,031

(22) Filed: Feb. 25, 2019

Related U.S. Application Data

(63) Continuation-in-part of application No. 16/106,436, filed on Aug. 21, 2018, now Pat. No. 10,257,058.

(60) Provisional application No. 62/691,806, filed on Jun. 29, 2018, provisional application No. 62/686,791, filed on Jun. 19, 2018, provisional application No. 62/685,814, filed on Jun. 15, 2018, provisional application No. 62/667,616, filed on May 7, 2018, provisional application No. 62/664,001, filed on Apr. 27, 2018.

(51) Int. Cl.
| | | |
|---|---|---|
| *G06F 15/173* | (2006.01) |
| *G06F 9/54* | (2006.01) |
| *H04L 12/26* | (2006.01) |
| *H04L 12/851* | (2013.01) |
| *G06K 9/62* | (2006.01) |
| *H04L 29/06* | (2006.01) |
| *G06F 16/35* | (2019.01) |

(52) U.S. Cl.
CPC ............ *H04L 69/22* (2013.01); *G06F 16/353* (2019.01); *H04L 65/4084* (2013.01); *H04L 65/601* (2013.01)

(58) Field of Classification Search
CPC ... H04L 43/04; H04L 43/028; H04L 47/2441; H04N 21/23418; H04N 21/8549; H04N 21/44008; G06K 9/6267; G06F 9/542
USPC ....................................................... 709/224
See application file for complete search history.

(56) References Cited

U.S. PATENT DOCUMENTS

| | | | | |
|---|---|---|---|---|
| 9,158,974 B1* | 10/2015 | Laska | ...................... | G06T 7/246 |
| 9,230,250 B1* | 1/2016 | Parker | .................. | G06Q 20/203 |
| 9,449,229 B1* | 9/2016 | Laska | ................. | G06K 9/00765 |
| 9,501,915 B1* | 11/2016 | Laska | .................... | H04N 7/181 |

(Continued)

*Primary Examiner* — Ruolei Zong
(74) *Attorney, Agent, or Firm* — Michael B. Dodd; R. Jace Hirschi

(57) ABSTRACT

The present invention extends to methods, systems, and computer program products for ingesting streaming signals. Signal ingestion modules sample a frame from a raw streaming signal. A preliminary severity or possible event type is computed from the sampled frame. A deeper inspection request is triggered of the raw streaming signal or of another raw streaming signal. Segments of content from the raw streaming signal or the other raw streaming signal are inspected. An actual severity or actual event type is computed from the inspected content. The actual severity or actual event type can be included in a normalized signal.

20 Claims, 19 Drawing Sheets

(56) References Cited

U.S. PATENT DOCUMENTS

| | | | | |
|---|---|---|---|---|
| 2005/0183143 A1* | 8/2005 | Anderholm | ............ | G06F 11/32 |
| | | | | 726/22 |
| 2011/0040760 A1* | 2/2011 | Fleischman | ............ | G06Q 30/02 |
| | | | | 707/737 |
| 2017/0257654 A1* | 9/2017 | Branch | ................ | H04N 21/252 |
| 2018/0176607 A1* | 6/2018 | Shaw | ................... | H04N 21/235 |
| 2018/0192158 A1* | 7/2018 | Smith | ................... | H04N 21/812 |

* cited by examiner

INGESTING STREAMING SIGNALS

CROSS-REFERENCE TO RELATED APPLICATIONS

This application is a continuation in part of U.S. patent application Ser. No. 16/106,436, entitled "Ingesting Streaming Signals", filed Aug. 21, 2018, which is incorporated herein in its entirety.

This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety. This application claims the benefit of U.S. Provisional Patent Application Ser. No. 62/667,616, entitled "Normalizing Different Types Of Ingested Signals Into A Common Format", filed May 7, 2018, which is incorporated herein in its entirety. This application claims the benefit of U.S. Provisional Patent Application Ser. No. 62/685,814, entitled "Ingesting Streaming Signals", filed Jun. 15, 2018, which is incorporated herein in its entirety. This application claims the benefit of U.S. Provisional Patent Application Ser. No. 62/686,791, entitled, "Normalizing Signals", filed Jun. 19, 2018, which is incorporated herein in its entirety. This application claims the benefit of U.S. Provisional Patent Application Ser. No. 62/691,806, entitled "Ingesting Streaming Signals", filed Jun. 29, 2018, which is incorporated herein in its entirety.

BACKGROUND

1. Background and Relevant Art

Data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Extract, transform, and load (ETL) refers to a technique that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficially because it allows a user to access a desired portion of data in a desired format. However, ETL can be cumbersome as data needs evolve. Each change to the extracted data and/or the data storage results in the ETL process having to be restarted. Further, ETL can be difficult to implement with streaming data types.

BRIEF SUMMARY

Examples extend to methods, systems, and computer program products for ingesting streaming signals.

Signal ingestion modules sample a frame contained in a raw streaming signal from a signal source. In one aspect, the raw streaming signal is preliminarily classified as indicative of a real-world event-type through reference to a content classifier and from a hint with respect to the more complete content of the raw steaming signal include in the sampled frame. In another aspect, a preliminary severity of a possible real-world event of an event type is computed from a hint with respect to the more complete content of the raw steaming signal include in the sampled frame.

Based on a preliminary classification or a preliminary severity, a deeper inspection is triggered. In one aspect, the deeper inspection is of the raw streaming signal from which the frame was sampled. In another aspect, the deeper inspection is of another raw streaming signal from another signal source.

It may be that a raw streaming signal is separated into a plurality of segments concurrently with sampling a frame from the streaming signal and stored at a storage device. Performing a deeper inspection can include playing a segment, from among the plurality of segments, from the storage device and inspect content of the segment. In other aspects, performing a deeper inspection includes playing a segment from the signal source or from the other signal source and inspecting content of the segment. As such, a preliminary classification or preliminary severity based on a frame of one raw streaming signal can trigger a deeper inspection of the same raw streaming signal or a deeper inspection of another raw streaming signal.

In one aspect, a probability that the raw streaming signal is actually indicative of a real-world event of the event type is computed based on the inspected content. In another aspect, an actual severity of the real-world event of the real-world event type is computed based on a preliminary severity and the inspected content. A normalized Time, Location, Context (TLC) signal corresponding to the raw streaming signal is updated to include the probability or actual severity.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
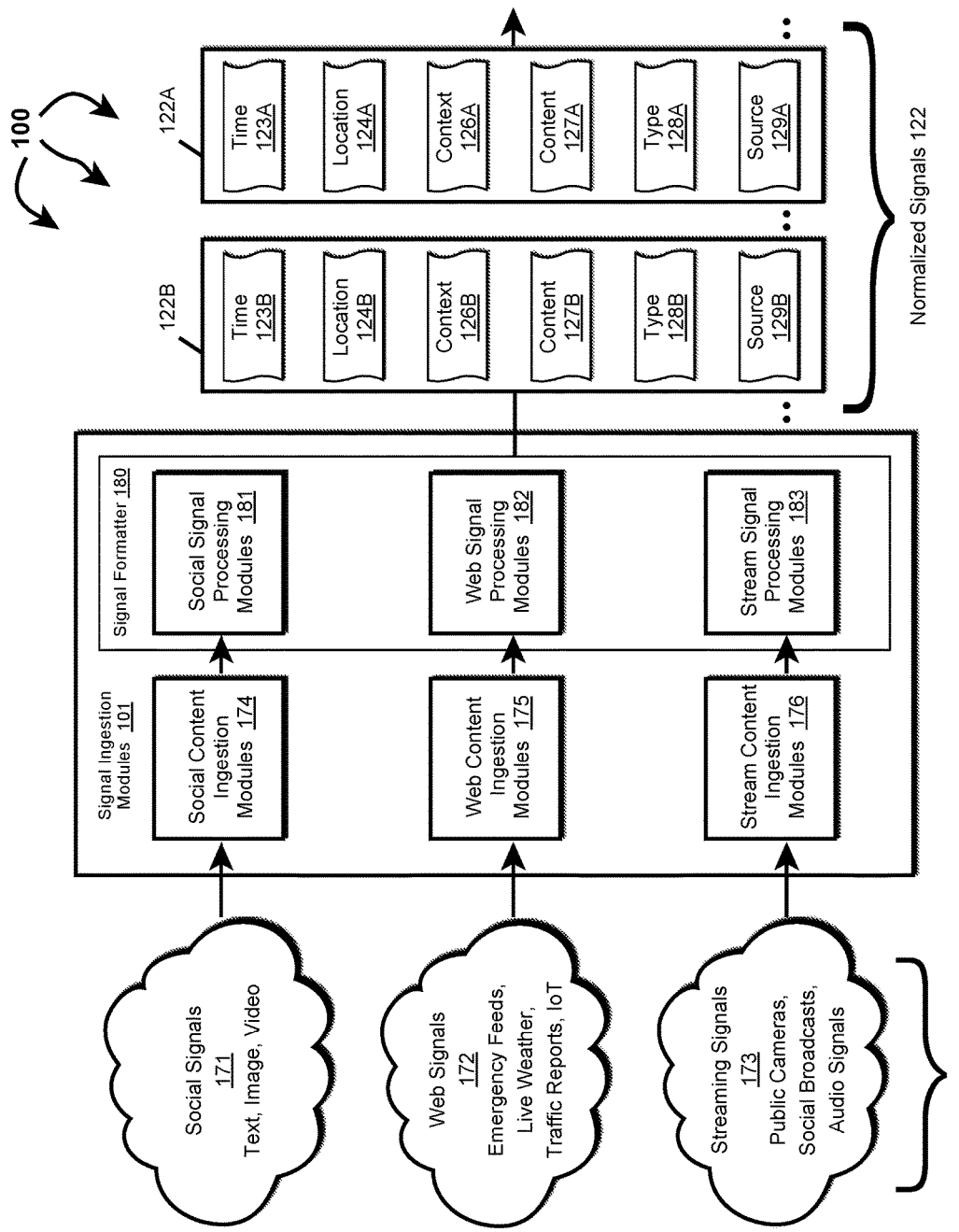
FIG. 1A illustrates an example computer architecture that facilitates normalizing ingesting signals.

Examples extend to methods, systems, and computer program products for ingesting streaming signals.

Entities (e.g., parents, other family members, guardians, friends, teachers, social workers, first responders, hospitals, delivery services, media outlets, government entities, etc.) may desire to be made aware of relevant events as close as possible to the events' occurrence (i.e., as close as possible to "moment zero"). Different types of ingested signals (e.g., social media signals, web signals, and streaming signals) can be used to detect events.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

More specifically, signal ingestion modules can ingest a raw streaming signal. The signal ingestion modules separate the raw streaming signal into a plurality of segments. The signal ingestion modules store the plurality of segments at a storage device.

In one aspect, the signal ingestion modules sample a plurality of frames contained in the raw streaming signal. It is determined that content in the plurality of sampled frames indicates a possible event type. For example, the plurality of sampled frames can be submitted to a source classifier. The source classifier detects the possible event type. In this aspect, detecting the possible event triggers deeper inspection of the streaming signal.

In another aspect, the signal ingestion modules ingest an additional signal. The additional signal can be related to the ingested streaming signal along one or more dimensions (e.g., time, location, context, etc.). In this other aspect, ingesting the additional signal triggers deeper inspection of the streaming signal.

To facilitate deeper inspection, the signal ingestion modules play a segment, from among the plurality of segments (e.g., in response to the indicated possible event type or ingesting the additional signal). The content of the segment is inspected during playing of the segment. The possible event type is confirmed or not confirmed as an actual event type based on the inspection. When confirmed, the context of the streaming signal is updated to include the event type.

In one aspect, the source classifier inspects playing of the segment. The source classifier confirms or does not confirm the actual event type.

In further aspects, signal ingestion modules sample a frame contained in a raw streaming signal from a signal source. In one aspect, the raw streaming signal is preliminarily classified as indicative of a real-world event-type through reference to a content classifier and from a hint with respect to the more complete content of the raw steaming signal include in the sampled frame. In another aspect, a preliminary severity of a possible real-world event of an event type is computed from a hint with respect to the more complete content of the raw steaming signal include in the sampled frame.

Based on a preliminary classification or a preliminary severity, a deeper inspection is triggered. In one aspect, the deeper inspection is of the raw streaming sample from which the framed was sampled. In another aspect, the deeper inspection is of another raw streaming signal from another signal source.

It may be that a raw streaming signal is separated into a plurality of segments concurrently with sampling a frame from the streaming signal and stored at a storage device. Performing a deeper inspection can include playing a segment, from among the plurality of segments, from the storage device and inspect content of the segment. In other aspects, performing a deeper inspection includes playing a segment from the signal source or from the other signal source and inspecting content of the segment. As such, a preliminary classification or preliminary severity based on a frame of one raw streaming signal can trigger a deeper inspection of the same raw streaming signal or a deeper inspection of another raw streaming signal.

In one aspect, a probability that the raw streaming signal is actually indicative of a real-world event of the event type is computed based on the inspected content. In another aspect, an actual severity of the real-world event of the real-world event type is computed based on a preliminary severity and the inspected content. A normalized Time, Location, Context (TLC) signal corresponding to the raw streaming signal is updated to include the probability or actual severity.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Signal features can include: signal type, signal source, signal content, Time (T) dimension, Location (L) dimension, Context (C) dimension, other circumstances of signal creation, etc.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, signal features, single source probabilities, times, time dimensions, locations, location dimensions, geo cells, geo cell entries, designated market areas (DMAs), contexts, location annotations, context annotations, classification tags, context dimensions, events, media signals, sampled frames, segmented media streams, deep inspection requests, segments, A/V segments, classifications, normalized media signals, throttle commands, metadata, preliminary severities, actual severities, replay requests, stream requests, streaming signals, streaming signal replays, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, signal features, single source probabilities, times, time dimensions, locations, location dimensions, geo cells, geo cell entries, designated market areas (DMAs), contexts, location annotations, context annotations, classification tags, context dimensions, events, media signals, sampled frames, segmented media streams, deep inspection requests, segments, A/V segments, classifications, normalized media signals, throttle commands, metadata, preliminary severities, actual severities, replay requests, stream requests, streaming signals, streaming signal replays, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| geohash Length/ Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

Streaming signals 173 can include live video and/or non-live (previously stored) video.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 177 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

Figure 1B:
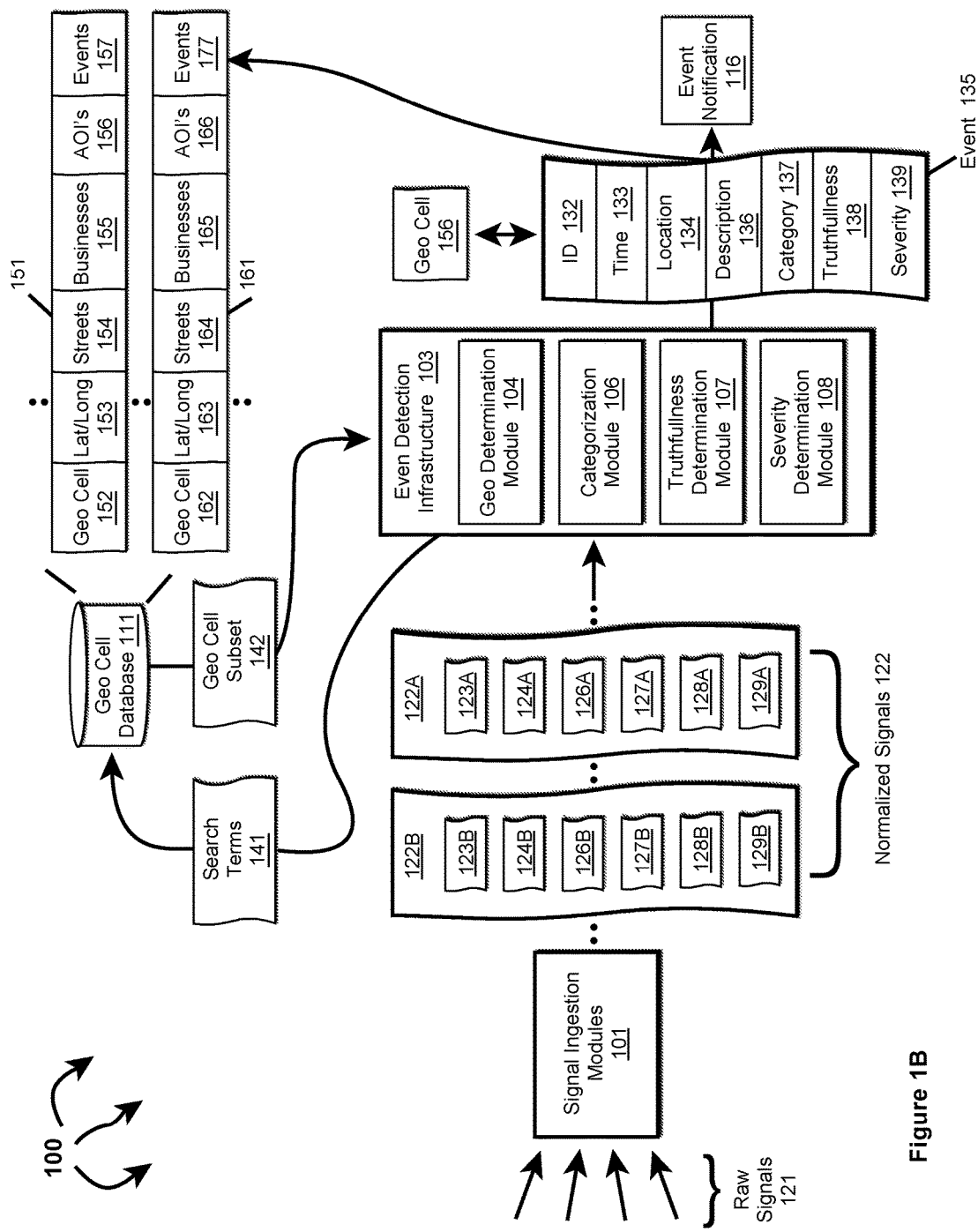
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Figure 2:
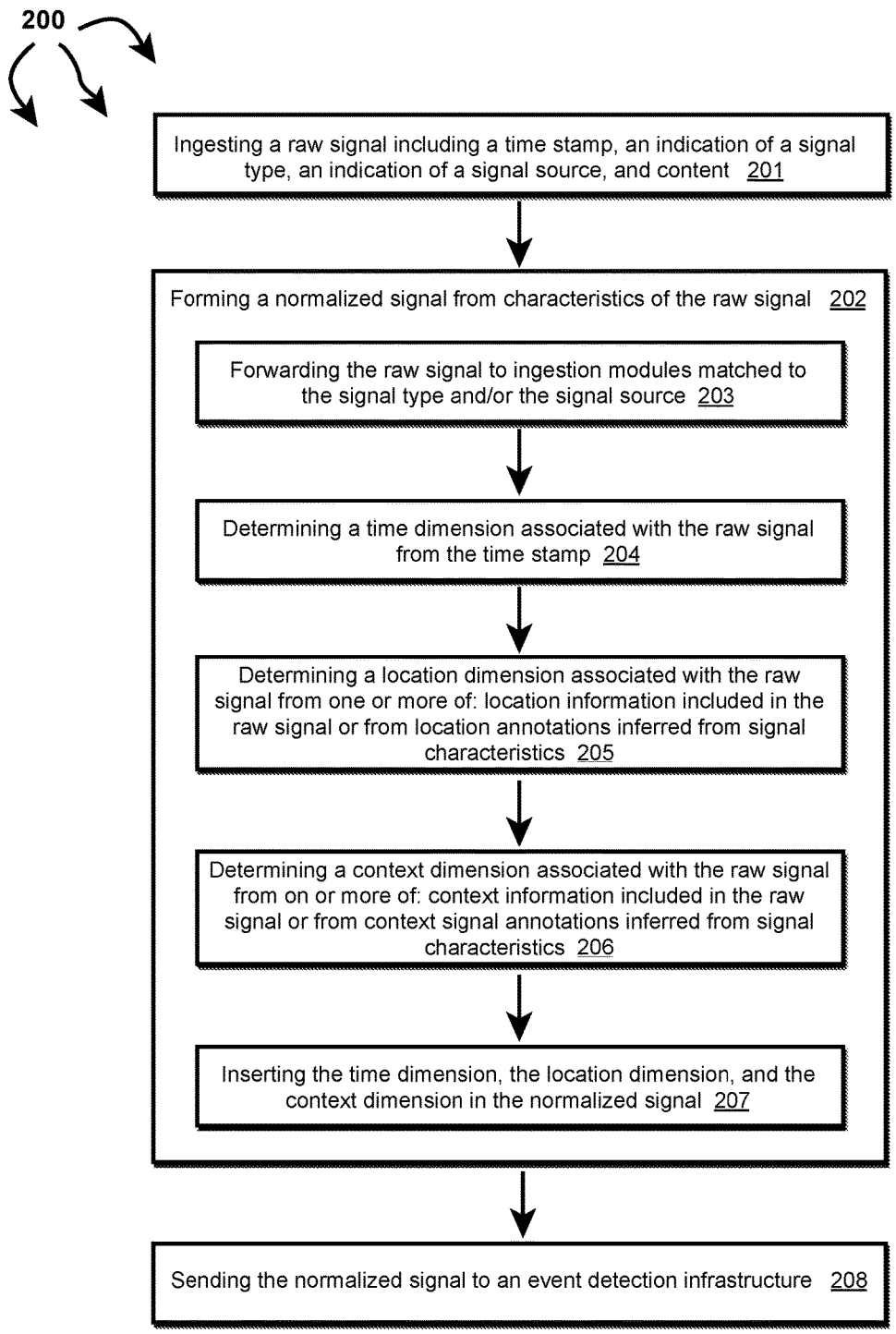
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Normalizing Ingested Signals

Figure 3A:
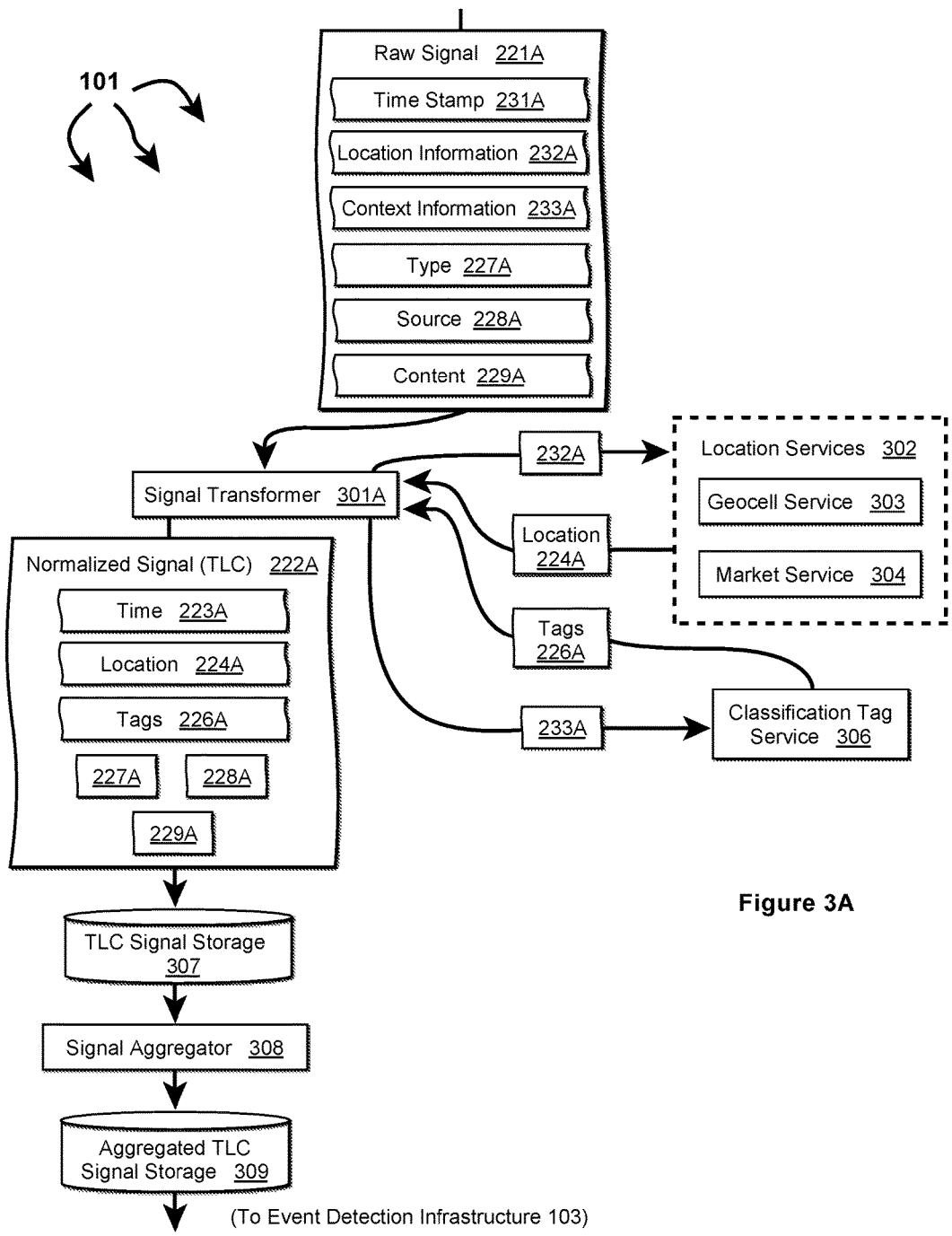
FIGS. 3A, 3B, and 3C illustrate other example components that can be included in signal ingestion modules.
Figure 3B:
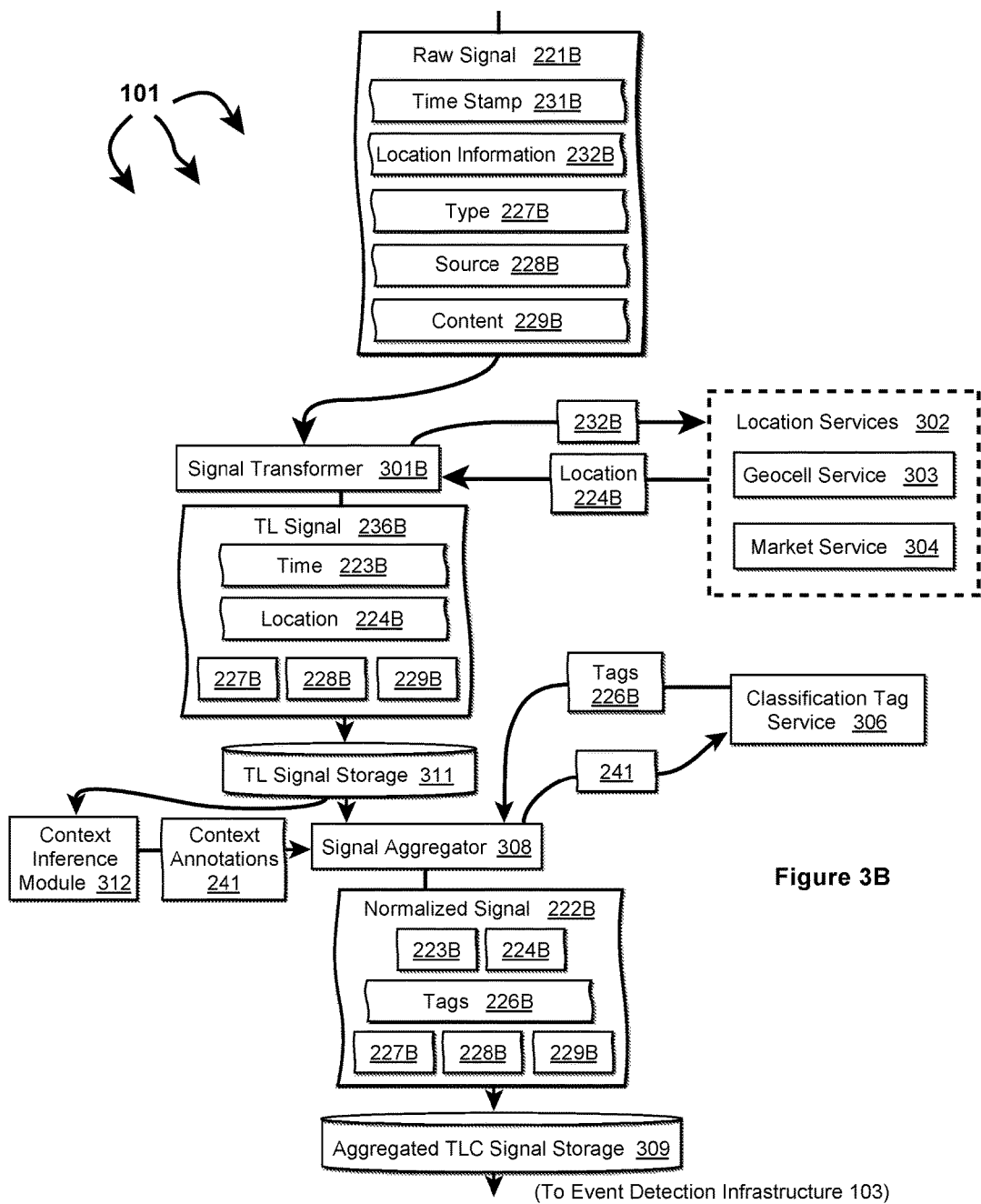
Figure 3C:
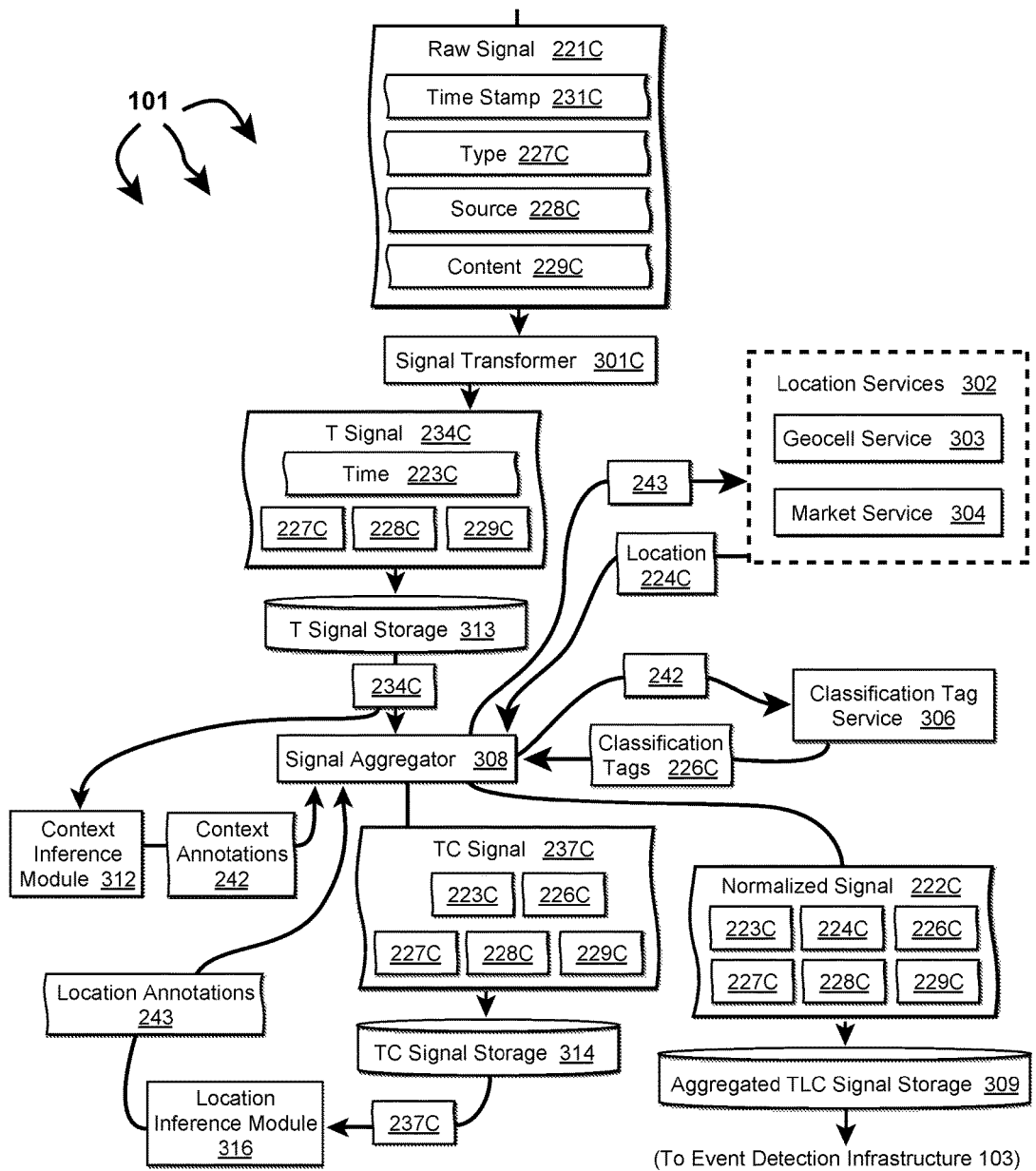

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 176, stream content ingestion modules 177, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
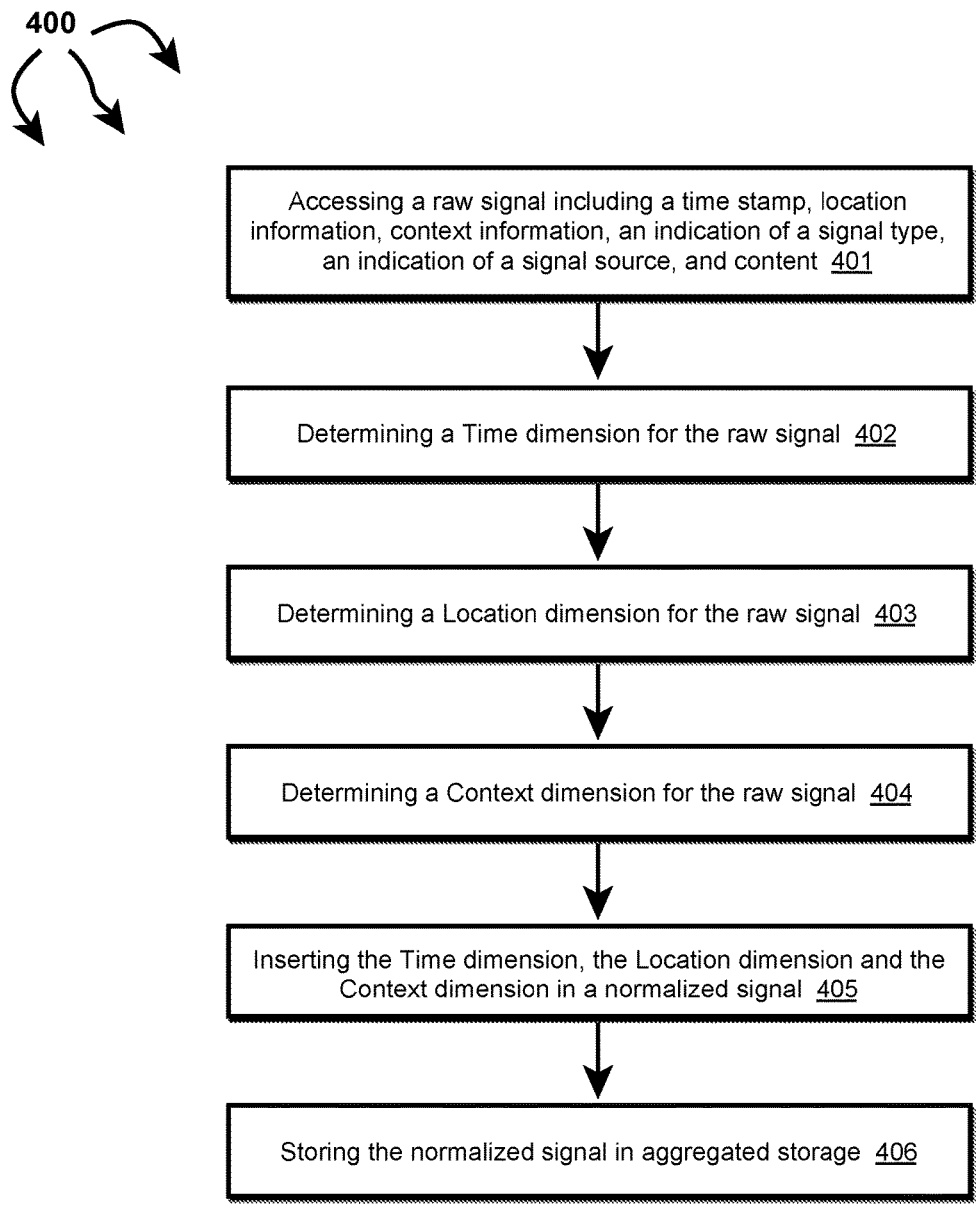
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
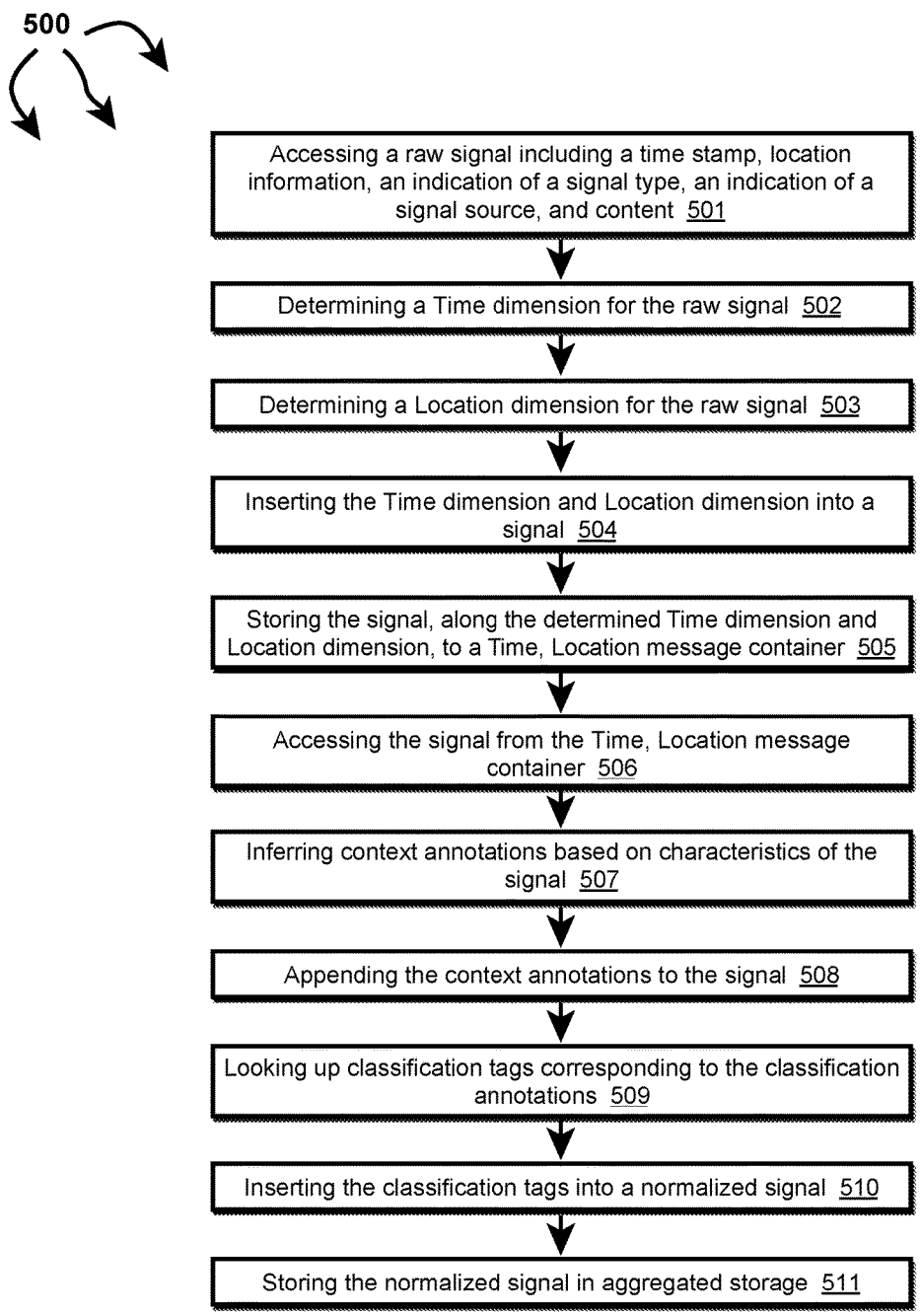
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 212 includes one or more of: NLP modules, audio analysis modules, image analysis modules, video analysis modules, etc. Context inference module 212 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 212 can infer that content 229B is related to a fire. Context inference 212 module can return context annotations 241 to signal aggregator 208.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
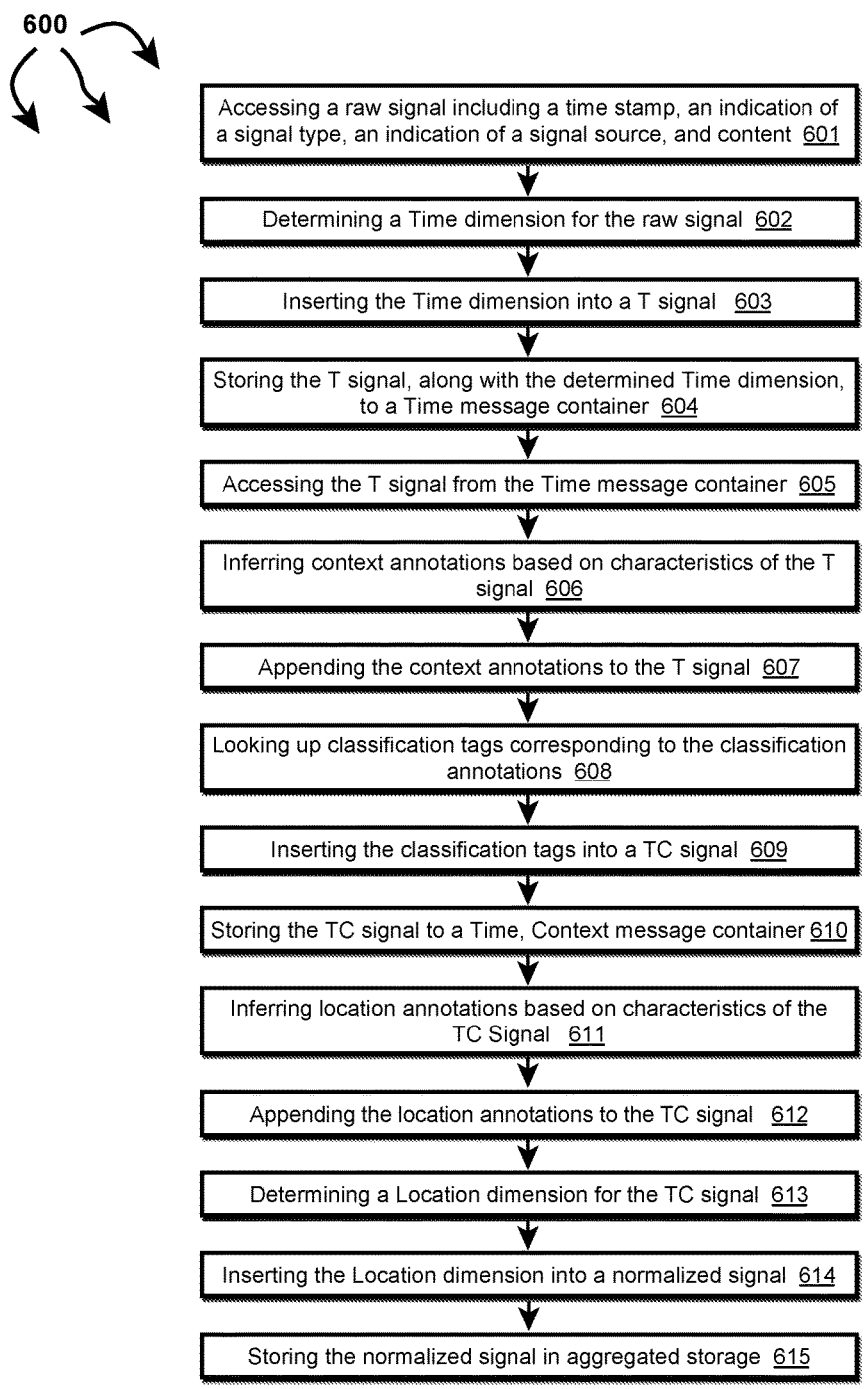
FIG. 6 illustrates a flow chart of an example method for normalizing an ingested signal including time information.

FIG. 6 illustrates a flow chart of an example method 600 for normalizing an ingested signal including time information and location information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 212 can include one or more of: NLP modules, audio analysis modules, image analysis modules, video analysis modules, etc. Context inference module 212 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 212 can infer that content 229C is related to an accident. Context inference 212 module can return context annotations 242 to signal aggregator 208.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 208.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 241, and location annotations 24, can also be included (or remain) in normalized signal 222B).

In another aspect, a Location dimension is determined prior to a Context dimension when a T signal is accessed. A Location dimension (e.g., geo cell and/or DMA) and/or location annotations are used when inferring context annotations.

Accordingly, location services 302 can identify a geo cell and/or DMA for a signal from location information in the signal and/or from inferred location annotations. Similarly, classification tag service 306 can identify classification tags for a signal from context information in the signal and/or from inferred context annotations.

Ingesting Streaming Signals

Figure 7A:
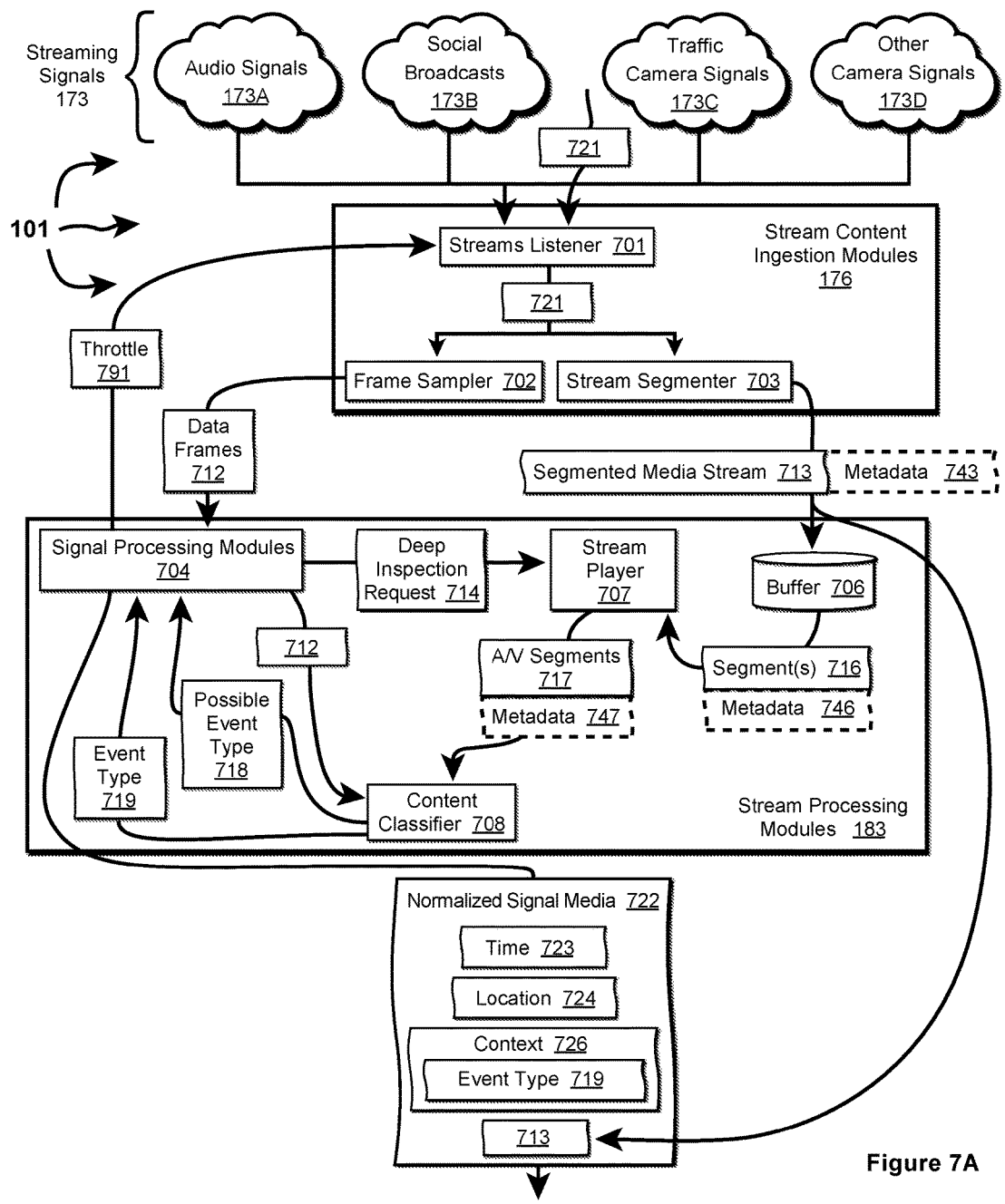
FIG. 7A illustrates an example arrangement of components that can be included in signal ingestion modules to ingest streaming signals.

FIG. 7A illustrates an example arrangement of components that can be included in signal ingestion modules 101. The components illustrated in FIG. 7A can be used to ingest and normalize raw streaming signals. As depicted, stream content ingestion modules 176 can further include streams listener 701, frame sampler 702, and stream segmenter 703. Stream signal processing modules 183 further includes signal processing modules 704, buffer 706, stream player 707, and content classifier 708. Streaming signals 173 can include audio signals 173A, social broadcasts 173B, traffic camera signals 173C, and other camera signals 173D.

In one aspect, one or more of: streams listener 701, frame sampler 702, stream segmenter 703, signal processing modules 704, buffer 706, stream player 707, and content classifier 708 are integrated into and/or interoperate with other components of signal ingestion modules 101 to facilitate signal normalization. For example, streams listener 701, frame sampler 702, stream segmenter 703, signal processing modules 704, buffer 706, stream player 707, and content classifier 708 can be integrated into and/or interoperate with any of: signal transformers (e.g., 301A, 301B, 301C), location services 302, classification tag service 306, signal aggregator 308, context inference module 312, or location inference module 316 to normalize raw signals. Streams listener 701, frame sampler 702, stream segmenter 703, signal processing modules 704, buffer 706, stream player 707, and content classifier 708 can interoperate to implement "transdimensionality" transformations to reduce raw streaming signal dimensionality.

In general, stream content ingestion modules 176 can ingest signals from any of audio signals 173A, social broadcasts 173B, traffic camera signals 173C, and other camera signals 173D. For example, streams listener 701 can listen for any of audio signals 173A, social broadcasts 173B, traffic camera signals 173C, and other camera signals 173D. Streams listener 701 can listen for different types of streaming signals in different ways. For example, streams listener 701 can connect to an Internet Protocol (IP) address associated with a traffic camera to listen for a traffic camera signal (e.g., sent using RTMP protocol). Traffic camera signals can include a video stream.

Links (e.g., URLs) to social broadcasts can be included in other content, such as, for example, social media messages. Streams listener 701 can access a link to listen to a social broadcast. Social media broadcasts can be transferred using DASH protocol, HLS protocol, etc. Social media broadcasts can include a video stream and an audio stream.

Content streamed using DASH can be associated with a Media Presentation Description (MPD) (an XML document) containing information about media segments, their relationships and information for choosing between them, as well as other client metadata describing presentation of media content (see ISO/IEC 23009 which is incorporated by reference in its entirety). HLS can also use manifests that define stream characteristics to adapt to changing network conditions (see RFC 8216 which is incorporated by reference in its entirety).

Streaming signals can also include data/metadata streams, automatic vehicle location (AVL) data, Internet of Things (IoT) data, drone telemetry, Federal Aviation Association (FAA) telemetry, satellite telemetry, radar data, water level data, etc.

Stream segmenter 703 is configured to segment a streaming signal into segments. Stream segmenter 703 can use information in a manifest when available. Alternately, stream segmenter 703 can independently determine segments for a streaming signal. Stream segmenter 703 can store stream segments in buffer 706. Stream segmenter 703 can also generate metadata describing the content in each segment. The metadata can travel along with the segment. As such, a 3rd party can tap into the segments and use the metadata to understand the meaning of segment contents.

Stream segmenter 703 can also accumulate metadata about a streaming signal as the streaming signal is segmented. Generally, accumulated metadata can "tell a story" about a corresponding streaming signal. Accumulated metadata can be used when deriving a context dimension for the corresponding streaming signal.

Buffer 706 can include durable storage and/or system memory. Stream segmenter 703 can store segments and associated metadata in buffer 706 to provide multi consumer access by time and range indexing (e.g., index time by camera ID). Buffer 706 provides a temporal and cost-efficient buffer facilitating efficient read/write access to streaming media segments. Stream segments can be stored in buffer 706 for a specified amount time (e.g., 15 seconds to two minutes) after which they are removed (freeing up space for more recently ingested segments).

Frame sampler 702 can sample frames, including content and/or metadata from a streaming signal. The sampled content and/or metadata can be used as a video hint or audio hint with respect to the more complete content of the streaming signal. Frame sampler 702 can send sampled content and/or metadata to signal processing modules 704. Frame sampler 702 and stream segmenter 703 can operate concurrently on streaming signals.

Signal processing modules 704 can forward sampled content and/or metadata to content classifier 708. Content classifier 708 can attempt to preliminarily classify the streaming signal as a type of event based on the sampled content and/or metadata. Content classifier 708 can compute a preliminary classification using one or more of: artificial intelligence, machine learning, neural networks, logic, heuristics, etc.

In one aspect, content classifier 708 classifies the streaming signal as a possible type of event based on the sampled content and/or metadata. Content classifier 708 can return a possible event type to signal processing modules 704. In response to receiving a possible event type, signal processing modules 704 can request a deeper inspection of the streaming signal from stream player 707.

In response to a request for deeper inspection, stream player 707 can access one or more segments of the streaming signal (and any associated metadata) from buffer 706. Stream player 707 can replay the one or more segments to content classifier 708. Stream player 707 can select a segment size so that data is sent to content classifier 708 in digestible chunks.

Content classifier 708 can attempt to confirm classification of the possible type of event from replay of the one or more segments. As such, content classifier 708 can confirm a possible event type classification or deny a possible event type classification preliminarily detected from sampled content and/or metadata. When content classifier 708 confirms the possible event type classification, content classifier 708 returns the event type to signal processing modules 704. On the other hand, when content classifier 708 does not confirm the possible event type classification, content classifier 708 notifies signal processing modules 704 that the event type classification was not detected.

When an event type classification is confirmed, signal processing modules 704 can form a normalized media signal including time, location, and context (including the event type classification) dimensions and the segmented media stream. Signal processing modules 704 can send the normalized media signal to event detection infrastructure 103.

In another aspect, content classifier 708 does not classify the streaming signal as a possible type of event based on the sampled content and/or metadata. Content classifier 708 notifies signal processing modules 704 that an event type classification was not detected. When a possible event type is not classified, there is a significantly reduced likelihood of a streaming signal actually indicating an event. As such, further resources are not allocated/consumed to inspect segments corresponding to sampled data frames.

In one aspect, streams listener 701 ingests raw streaming signals by sampling raw streaming signals at a specified sampling frequency. When a possible event is not detected or when a possible event is not confirmed, signal processing modules 704 can reduce the sampling frequency of (i.e., throttle down) streams listener 701 or can instruct streams listener 701 to stop sampling. Reducing sampling frequency or stopping sampling conserves computing and network resources.

Subsequently, a possible event can be detected from further portions of the raw streaming signal sampled at the reduced sampling frequency. In response to a detected possible event, signal processing modules 704 can increase the sampling frequency of (e.g., throttle up) streams listener 701.

It is also possible over time that different portions of a streaming signal indicate ongoing event changes and different types of events. For example, a possible fire indicated by smoke can develop into an explosion, a small fender bender can develop into a multi-vehicle pileup, etc. Thus, streaming signals can be re-evaluated for event type classification at specified intervals, such as, for example, every 1-3 seconds. Revaluation can include restarting sampling.

Signal processing modules 704 can also restart sampling, for example, after a specified interval of slow sampling or stoppage or when a new streaming signal is ingested. Signal processing modules 704 can throttle sampling up when a streaming signal is more likely to indicate an event, for example, when further sampled data frames indicate a possible event type.

Indications of changing events and changing event type classifications can be maintained and provided to interested entities.

Accordingly, resource allocation is tailored to the likelihood of a streaming signal actually indicating an event. A less resource intensive attempt to classify a streaming signal is performed from sampled frames. If the less resource intensive attempt fails to classify a possible event, a more resource intensive deeper inspection is not performed. On the other hand, if the less resource intensive attempt does classify a possible event, a more resource intensive deeper inspection can be performed. As such, additional resources can be allocated/consumed for deeper inspection when there is an increased chance of actual event type detection. However, additional resources are not allocated/consumed for deeper inspection when there is reduced chance of actual event type detection (and thus allocation/consumption of the additional resources is less likely to provide any further benefit related to event detection).

Figure 8:
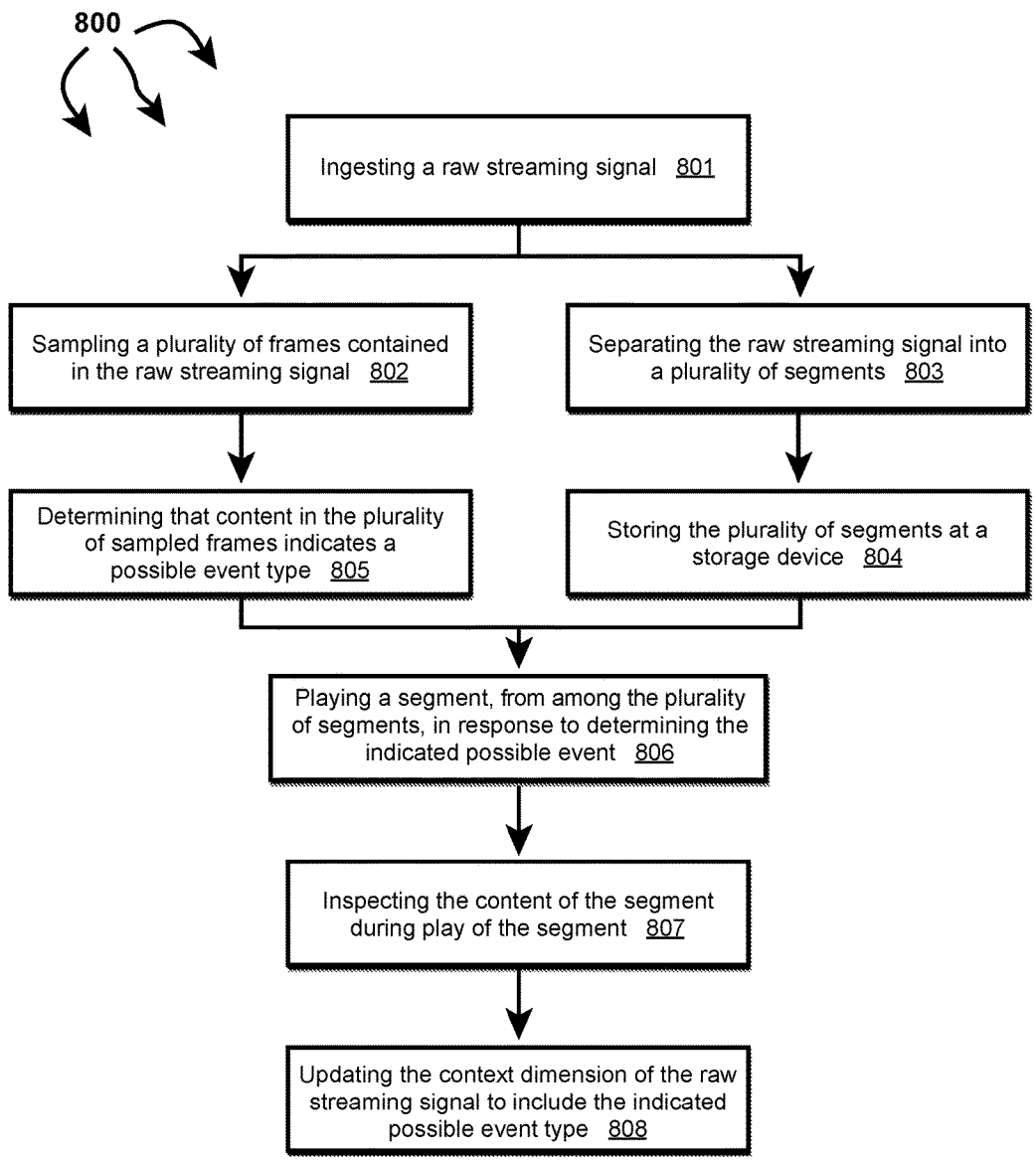
FIG. 8 illustrates a flow chart of an example method for ingesting a streaming signal.

FIG. 8 illustrates a flow chart of an example method 800 for ingesting streaming signals. Method 800 will be described with respect to the components and data in FIG. 7A.

Method 800 includes ingesting a streaming signal (801). For example, streams listener 701 can ingest a raw streaming signal 721. Raw streaming signal 721 can be included in raw signals 121. Raw streaming signal 721 can originate from any of: audio signals 173A, social broadcasts 173B, traffic camera signals 173C, or other camera signals 173D. Raw streaming signal 721 can be in a packet, segment, or analog format and can include one or more of: a video bitstream and an audio bitstream. Streams listener 701 may convert raw streaming signal 721 for compatibility with other components of signal ingestion modules 101. Raw streaming signal 721 can be a live video and/or a non-live video.

Method 800 includes sampling a subset of frames from the streaming signal (802). For example, frame sampler 702 can sample data frames 712 (e.g., content and/or metadata) from raw streaming signal 721. Frame sampler 702 can send data frames 712 to signal processing modules 704.

Method 800 includes separating the streaming signal into a plurality of segments (803). For example, concurrent with frame sampling, stream segmenter 703 can segment raw streaming signal 721 into a plurality of segments. Stream segmenter 703 can select segment size so that segments are digestible by content classifier 208. Method 800 includes storing the plurality of segments at a storage device (804). For example, stream segmenter 703 can store segmented media stream 713 in buffer 706. Stream segmenter 703 can also identify metadata 743 and store metadata 743 along with segmented media stream 713.

Method 800 includes determining that content in the subset of frames possibly indicates a type of event (805). For example, signal processing modules 704 can send data frames 712 to content classifier 708. Content classifier 708 can preliminarily classify raw streaming signal 721 as possible event type 718 based on data frames 712. Content classifier 708 can return possible event type 718 (i.e., a hint with respect to segmented media stream 713 indicting an event) to signal processing modules 704.

In another aspect, content classifier 708 does not classify raw streaming signal 721 as possible event type based on data frames 712.

Detection of possible event type 718 can trigger deeper inspection of streaming signal 721. For example, in response to receiving possible event type 718, signal processing modules 704 can send deep inspection request 714 to stream player 707.

Method 800 includes playing a segment of the streaming signal, from among the plurality of segments, in response to determining that the content in the subset of frames possibly indicates the type of event (806). For example, in response to deep inspection request 714, stream player 707 can access one or more segments 716 of segmented media stream 713 and corresponding metadata 746 (part of metadata 743) from buffer 206. Stream player 707 can play A/V segments 717 and send metadata 747 (part of metadata 746) to content classifier 708.

Method 800 includes inspecting the content of the segment during play of the segment (807). Content classifier 708 can inspect the content of A/V segments 717 during play. In one aspect, content classifier 708 confirms possible event type 718 based on inspection of A/V segments 717. For example, from inspection of A/V segments 717 (possibly in combination with metadata 747), content classifier 708 can confirm possible event type 718 as event type 719 (i.e., possible event type 718 and event type 719 can indicate the same type of event). Content classifier 708 can send event type 719 to signal processing modules 704.

In another aspect, content classifier 708 does not confirm possible event type 718 based on inspection of A/V segments 717. For example, based on inspection of A/V segments 717 (possibly in combination with metadata 747), content classifier 708 can determine that possible event type 718 is not an event.

Method 800 includes updating the context dimension of the streaming signal to indicate the type of event (808). For example, signal processing modules 704 can determine context 726 for raw streaming signal 721. More generally, signal processing modules 704 can formulate normalized media signal 722, including time dimension 723, location dimension 724, context dimension 726 (including event type 719) and segmented media stream 713. Signal processing modules 704 can send normalized media signal 722 to event detection infrastructure 103. For example, normalized media signal 722 can be included in normalized signals 122. Event detection infrastructure 103 can use normalized media signal 722 (possibly in combination with other normalized signals) to detect an event.

When a possible event type is not detected from data frames 712 or when a possible event type is not confirmed as an actual event type from A/V segments 717, signal processing modules 704 can determine a reduced chance of detecting an event from the raw streaming signal at or near sampled frames 712 and/or inspected segments 716. Signal processing modules 704 can send throttle command 791 to streams listener 701. Throttle command 791 can instruct streams listener 701 to reduce the rate of sampling (or "back off") raw streaming signal 721. Reducing the sampling rate conserves computing and network resources.

Over time, as further portions of raw streaming signal 721 are received, the further portions can indicate an event type. It is also possible over time that different portions of raw streaming signal 721 indicate ongoing event changes and different types of events. For example, a possible fire indicated by smoke can develop into an explosion, a small fender bender can develop into a multi-vehicle pileup, etc. Thus, raw streaming signal 721 can be re-evaluated for event type classification at specified intervals, such as, for example, every 1-3 seconds.

Various different retention algorithms can be used to determine how long segments are retained, for example, based on streaming signal type.

Methods similar to method 800 can also be used to determine actual severity.

Figure 7B:
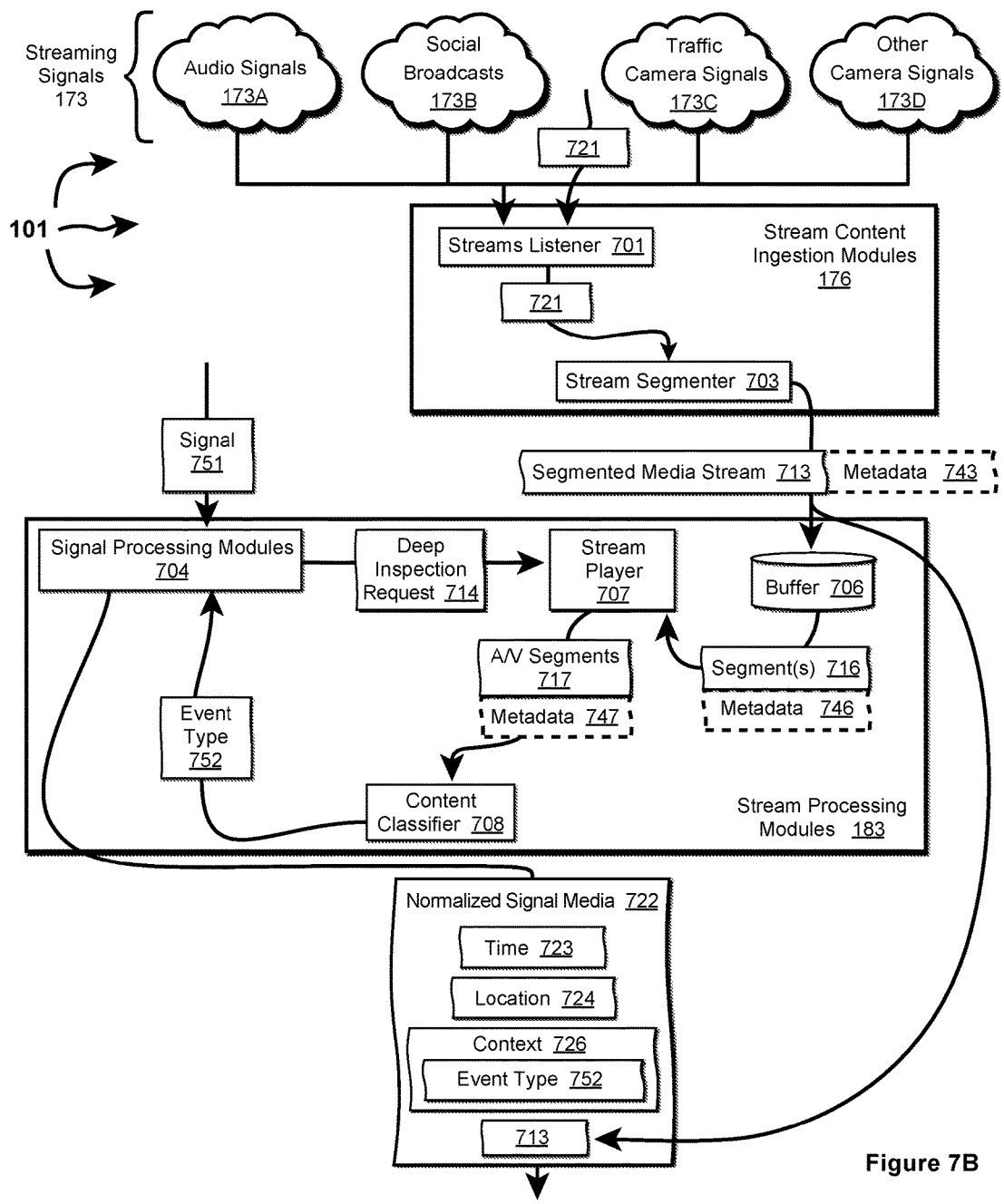
FIG. 7B illustrates another example arrangement of components that can be included in signal ingestion modules to ingest streaming signals.

FIG. 7B illustrates another example arrangement of components that can be included in signal ingestion modules 101. The components illustrated in FIG. 7B can be used to ingest and normalize raw streaming signals. The components illustrated in FIG. 7B are similar to FIG. 7A. However, stream content ingestion modules 176 do not include frame sampler 702. Signal processing modules 704 are configured to receive additional (e.g., out of band) signals. Additional signals can originate in social signals 171, web signals 172, or streaming signals 173. Other modules included in signal ingestion modules 101, for example, social signal processing modules 181, web signal processing modules 182, social content ingestion modules 174, web content ingestion modules 175, stream content ingestion modules 176, etc. can send additional signals to signal processing modules 704.

As described, resource allocation can be tailored to the likelihood of a streaming signal actually indicating an event. In one aspect, one or more other signals related to a streaming signal are received. Receiving the one or more related signals indicates an increased likelihood of an event occurring. Thus, a more resource intensive deeper inspection of a streaming signal is triggered in response to receive the one or more other signals. However, additional resources are not allocated/consumed for deeper inspection when there is reduced chance of actual event type detection, for example, when related signals are not received, (and thus allocation/consumption of the additional resources is less likely to provide any benefit related to event detection).

Figure 9:
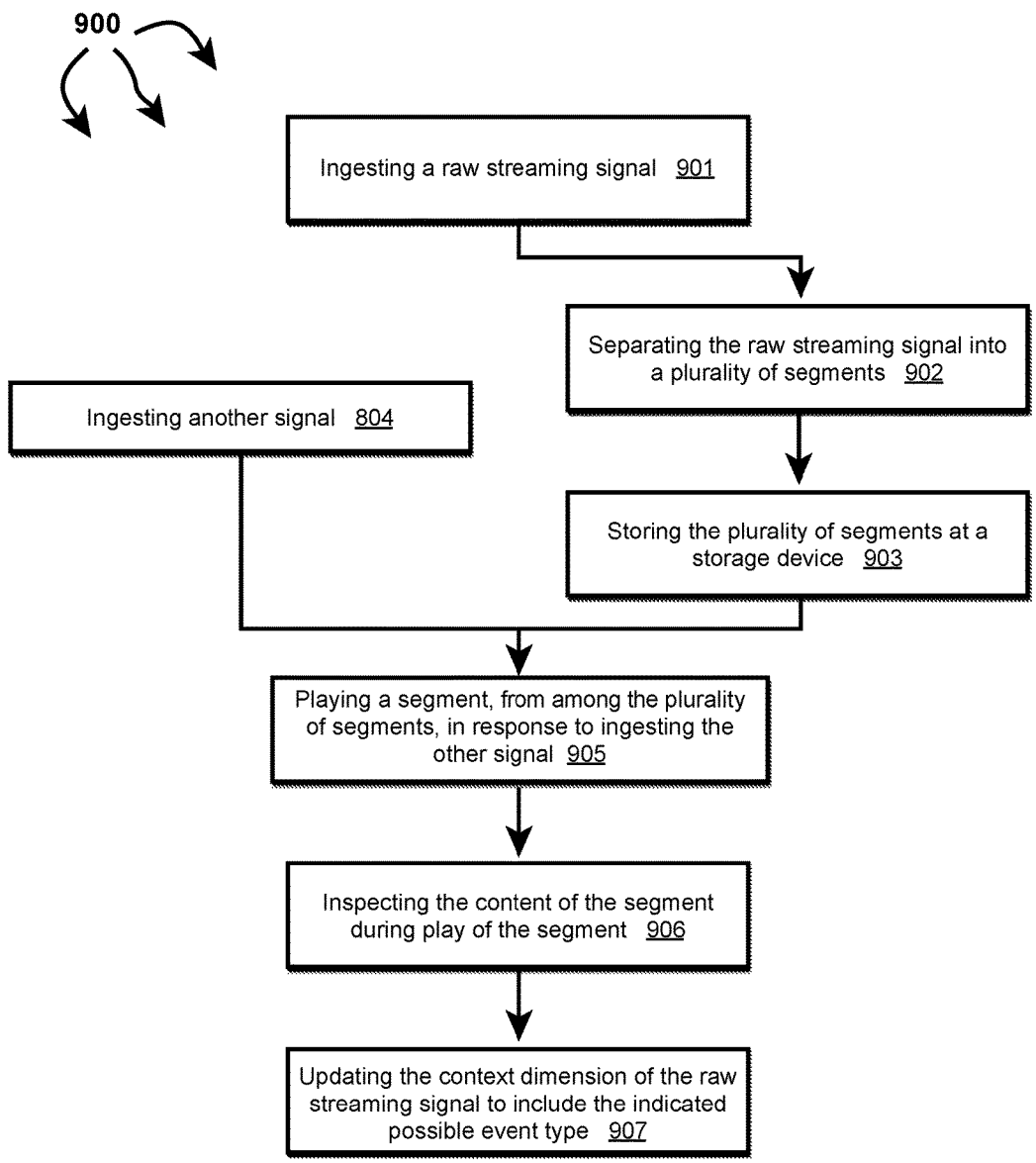
FIG. 9 illustrates a flow chart of an example method for ingesting a streaming signal.

FIG. 9 illustrates a flow chart of an example method 900 for ingesting streaming signals. Method 900 will be described with respect to the components and data in FIG. 7B.

Method 900 includes ingesting a streaming signal (901). For example, streams listener 701 can ingest a raw streaming signal 721. Method 900 includes separating the streaming signal into a plurality of segments (902). For example, stream segmenter 703 can segment raw streaming signal 721 into a plurality of segments. Stream segmenter 703 can select segment size so that segments are digestible by content classifier 208. Method 900 includes storing the plurality of segments at a storage device (903). For example, stream segmenter 703 can store segmented media stream 713 in buffer 706. Stream segmenter 703 can also identify metadata 743 and store metadata 743 along with segmented media stream 713.

Method 900 includes ingestion another signal (904). For example, signal processing modules 101 can ingest signal 751. Other modules included in signal processing modules 101 can send signal 751 (fully or partially normalized) to signal processing modules 704.

Receipt of signal 751 can trigger deeper inspection of streaming signal 721. For example, in response to receiving signal 751, signal processing modules 704 can send deep inspection request 714 to stream player 707.

Method 900 includes playing a segment of the streaming signal, from among the plurality of segments, in response to ingesting the other signal (905). For example, in response to deep inspection request 714, stream player 707 can access one or more (video and/or audio) segments 716 of segmented media stream 713 and corresponding metadata 746 (part of metadata 746) from buffer 206. Stream player 707 can play A/V segments 717 and send metadata 747 (part of metadata 746) to content classifier 708.

Method 900 includes inspecting the content of the segment during play of the segment (906). Content classifier 708 can inspect the content of A/V segments 717 during play. In one aspect, content classifier 708 detects event type 752 from inspection of A/V segments 717 (possibly in combination with metadata 747). Content classifier 708 can send event type 752 to signal processing modules 704.

In another aspect, content classifier 708 does not detect an event based on inspection of A/V segments 717. For example, based on inspection of A/V segments 717 (possibly in combination with metadata 747), content classifier 708 can determine that no event is occurring.

Method 900 includes updating the context dimension of the streaming signal to indicate the type of event (907). For example, signal processing modules 704 can determine context 726 for raw streaming signal 721. More generally, signal processing modules 704 can formulate normalized media signal 722, including time dimension 723, location dimension 724, context dimension 726 (including event type 752) and segmented media stream 713. Signal processing modules 704 can send normalized media signal 722 to event detection infrastructure 103. For example, normalized media signal 722 can be included in normalized signals 122. Event detection infrastructure 103 can use normalized media signal 722 (possibly in combination with other normalized signals) to detect an event.

Methods similar to method 900 can also be used to determine actual severity.

Throttling and retention can be managed similarly to mechanisms described with respect to FIG. 7A.

Resources allocated for streaming signal processing can be separated by geo cells. Increased resources can be allocated to locations with increased signal density. Thus, streaming signals originating in the same geo cell can be processed by the same set of allocated resources (i.e., streaming signals can be containerized). Resource allocations can be shifted between containers when appropriate, for example, when wide ranging or severe events are detected.

Determining Severity Of A Streaming Signal

Figure 10:
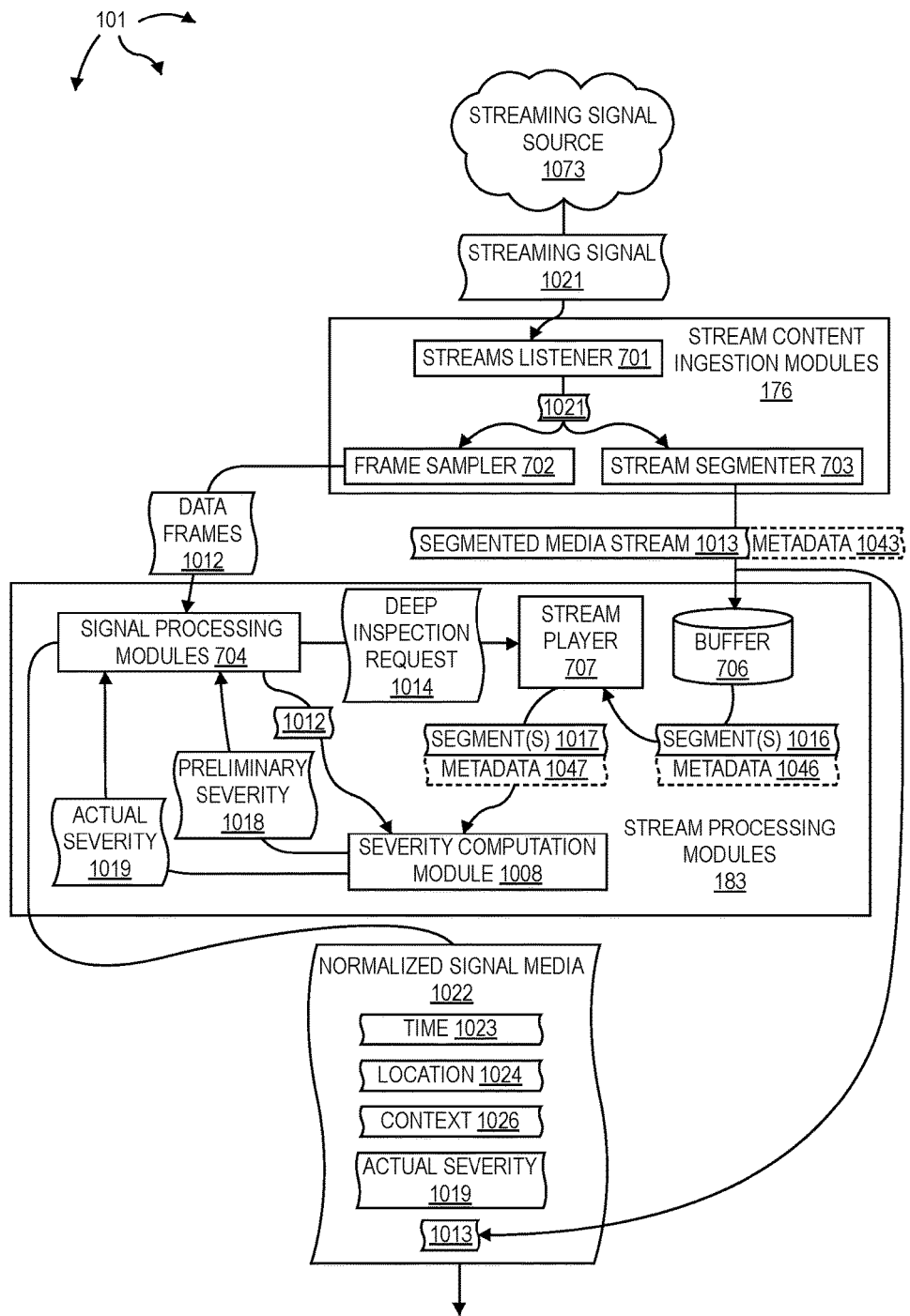
FIG. 10 illustrates an example arrangement of components that can be included in signal ingestion modules to ingest streaming signals.

FIG. 10 illustrates an example arrangement of components that can be included in signal ingestion modules 101 to ingest streaming signals. The components in FIG. 10 are similar to the components in FIG. 7A. However, instead of, or in combination with, content classier 708, FIG. 10 includes severity computation module 1008.

As described, buffer 706 can include durable storage and/or system memory. Stream segmenter 703 can store segments and associated metadata in buffer 706 to provide multi consumer access by time and range indexing (e.g., index time by camera ID). Buffer 706 provides a temporal and cost-efficient buffer facilitating efficient read/write access to streaming media segments. Stream segments can be stored in buffer 706 for a specified amount time (e.g., 15 seconds to two minutes) after which they are removed (freeing up space for more recently ingested segments).

As described streams listener 701 ingests raw streaming signals by sampling raw streaming signals at a specified sampling frequency. When a possible event is not detected or when a possible event is not confirmed, signal processing modules 704 can reduce the sampling frequency of (i.e., throttle down) streams listener 701 or can instruct streams listener 701 to stop sampling. Reducing sampling frequency or stopping sampling conserves computing and network resources.

Subsequently, a possible event can be detected from further portions of the raw streaming signal sampled at the reduced sampling frequency. In response to a detected possible event, signal processing modules 704 can increase the sampling frequency of (e.g., throttle up) streams listener 701.

Severity computation module 1008 is configured to compute a preliminary severity of a possible real-world event of a real-world event type from a streaming signal. Severity computation module 1008 can compute a preliminary severity from a hint with respect to the more complete content of a raw streaming signal included in a frame sampled from the raw streaming signal. Severity computation module 1008 is also configured to compute an actual severity of a real-world event of a real-world event type based on the preliminary severity and content inspected from a segment of the streaming signal (or content inspected from a segment of another streaming signal).

Severity computation module 1008 can include the functionality of severity determination module 108 and can interoperate with content classifier 708 as appropriate so that both a severity and a probability can be computed for a streaming signal. Severity can be computed from one or more segments stored at buffer 706 and/or from one or more segments taken of a streaming signal from a signal source (e.g., during play or playback from the signal source).

Figure 11:
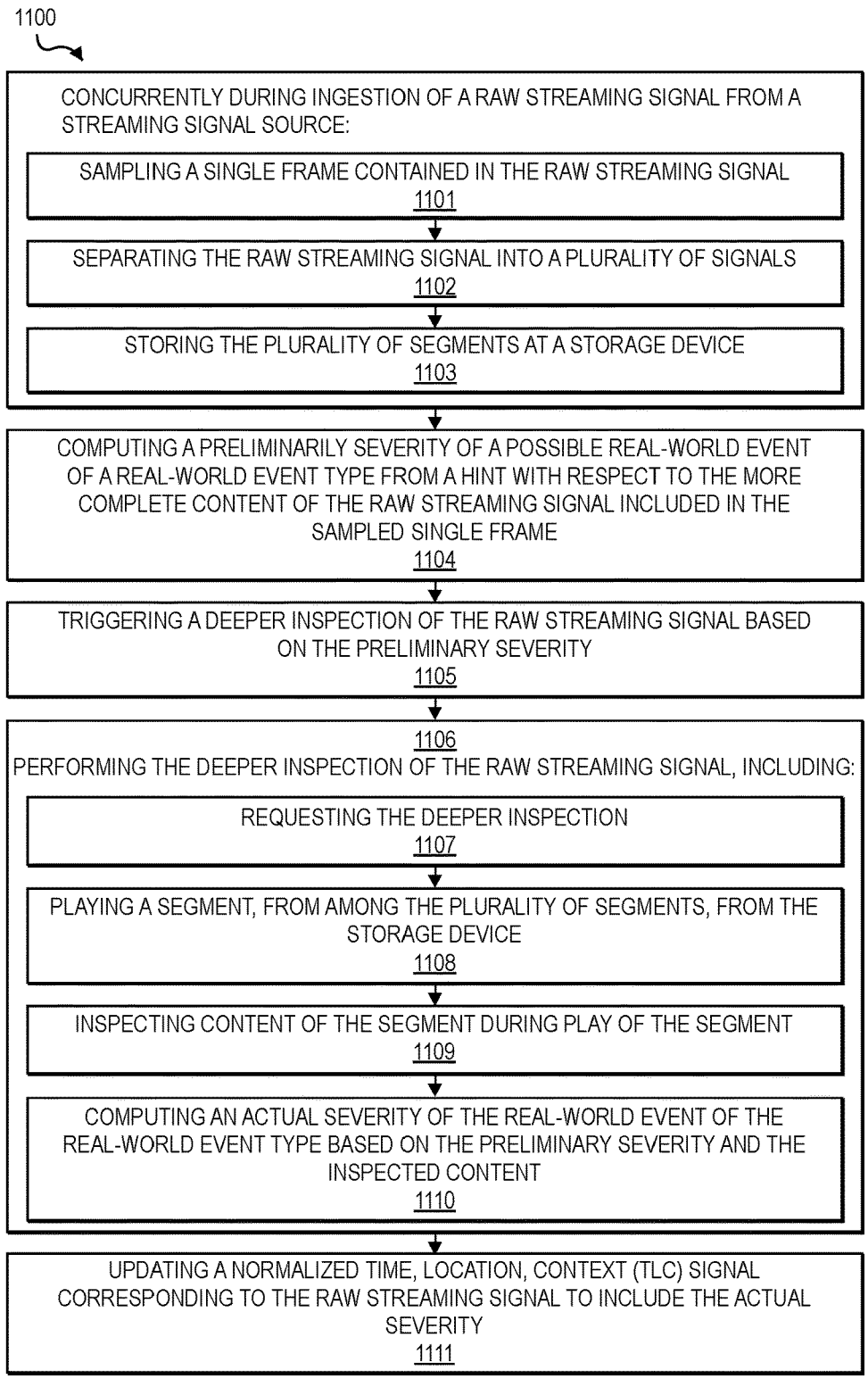
FIG. 11 illustrates a flow chart of an example method for ingesting a streaming signal.

FIG. 11 illustrates a flow chart of an example method 1100 for ingesting a streaming signal. Method 1100 will be described when respect to the components and data in FIG. 10.

Method 1100 includes concurrently during ingestion of a raw streaming signal from a streaming signal source, sampling a single frame contained in the raw streaming signal (1101), separating the raw streaming signal into a plurality of segments (1102), and storing the plurality of segments at a storage device (1103). For example, streams listener 701 can ingest a raw streaming signal 1021. Raw streaming signal 1021 can originate from streaming signal source 1073. Raw streaming signal 1021 can be any of the described types of streaming signal and can be in a packet, segment, or analog format. Streams listener 701 may convert raw streaming signal 1021 for compatibility with other components of signal ingestion modules 101. Raw streaming signal 1021 can be a live streaming single or replayed streaming signal.

Frame sampler 702 can sample one or more data frames 1012 from streaming signal 1021. Frame sampler 702 can send data frames 1012 to signal processing modules 704. Stream segmenter 703 can segment streaming signal 1021 into segemented media stream 1013. Stream segmenter 703 can select segment size so that segments can be efficiently processed by severity computation module 1008. Stream segmenter 703 can store segmented media stream 1013 in buffer 706. Stream segmenter 703 can also identify metadata 1043 and store metadata 1043 along with segmented media stream 1013.

Method 1100 includes computing a preliminarily severity of a possible real-world event of a real-world event type from a hint with respect to the more complete content of the raw streaming signal included in the sampled single frame (1104). For example, signal processing modules 704 can send data frames 1012 to severity computation module 1008. Severity computation module 1008 can compute preliminary severity 1018 of a possible real-world event of a real-world event type from a hint with respect to the more complete content of raw streaming signal 1021 included in one or more data frames 1012.

Method 1100 includes trigger a deeper inspection of the raw streaming signal based on the preliminary severity (1005). For example, in response to receiving preliminary severity 1018, signal processing modules 704 can trigger deep inspection request 1014 to stream player 707.

Method 1100 includes performing the deeper inspection of the raw streaming signal (1106). For example, severity computation module 1008 can perform a deeper inspection of streaming signal 1021. Performing the deeper inspection of the raw streaming signal can include, requesting the deeper inspection (1107). For example, signal processing modules 704 can send deep inspection request 1014 to stream player 707.

Performing the deeper inspection of the raw streaming signal can include playing a segment, from among the plurality of segments, from the storage device (1108). For example, in response to deep inspection request 1014, stream player 707 can access one or more segments 1016 of segmented media stream 1013 and corresponding metadata 1046 (part of metadata 1043) from buffer 706. Stream player 707 can play segments 1017 and send metadata 1047 (part of metadata 1046) to severity computation module 1008.

Performing the deeper inspection of the raw streaming signal can include inspecting the content of the segment during play of the segment (1109). Performing the deeper inspection of the raw streaming signal can include computing an actual severity of the real-world event of the real-world event type based on the preliminary severity and the inspected content (1110). For example, severity determination module 1008 can inspect segments 1017 during play. Severity computation module 1008 can compute actual severity 1019 based on preliminary severity 1018 and inspection of segments 1017 (possibly in combination with metadata 1047). Actual severity 1019 can be for the real-world event of the real-world event type. Severity computation module 1008 can send actual severity 1019 to signal processing modules 704.

Method 1100 includes updating a normalized Time, Location, Context (TLC) signal corresponding to the raw streaming signal to include the actual severity (1111). In general, signal processing modules 704 can formulate normalized media signal 1022, including time dimension 1023, location dimension 1024, context dimension 1026, and segmented media stream 1013. Signal processing modules 704 can also include actual severity 1019 in normalized signal media 1022. Normalized media signal 1022 can be included in normalized signals 122. Event detection infrastructure 103 can use normalized media signal 1022 (possibly in combination with other normalized signals) to detect an event.

Accessing Segments From A Signal Source

Figure 12:
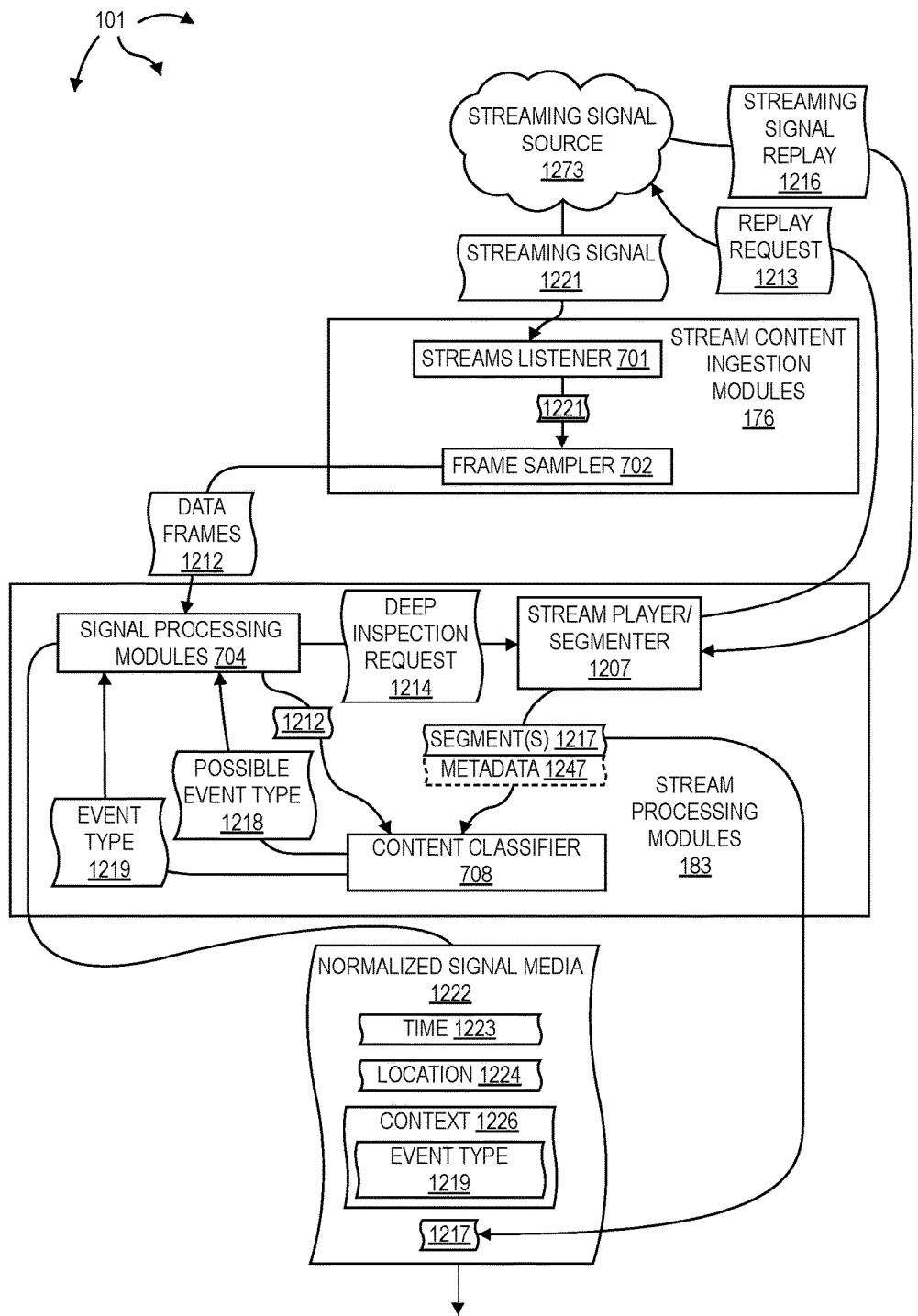
FIG. 12 illustrates an example arrangement of components that can be included in signal ingestion modules to ingest streaming signals.

FIG. 12 illustrates an example arrangement of components that can be included in signal ingestion modules 101 to ingest streaming signals. The arrangement of components in FIG. 12 is similar to the arrangement of components in FIG. 7.

As depicted, stream processing modules 183 include stream player/segmenter 1207. In response to a deep inspection request, stream player/segmenter 1207 can send a replay request to a streaming signal source to request replay of part of a streaming signal. Streaming player/segmenter 1207 can play a requested part of a streaming signal from the streaming signal source. Streaming player/segmenter 1207 can also segment part of streaming signal into segments and metadata. Streaming player/segmenter 1207 can send segments of a streaming signal and metadata to content classifier 708.

Stream player/segmenter 1207 can ingest raw streaming signals by sampling raw streaming signals at a specified sampling frequency. When a possible event is not detected or when a possible event is not confirmed, Stream player/segmenter 1207 can reduce the sampling frequency (i.e., throttle down) or can stop sampling. Reducing sampling frequency or stopping sampling conserves computing and network resources.

Subsequently, a possible event can be detected from further portions of the raw streaming signal sampled at the reduced sampling frequency. In response to a detected possible event, stream player/segmenter 1207 can increase the sampling frequency (e.g., throttle up).

Figure 13:
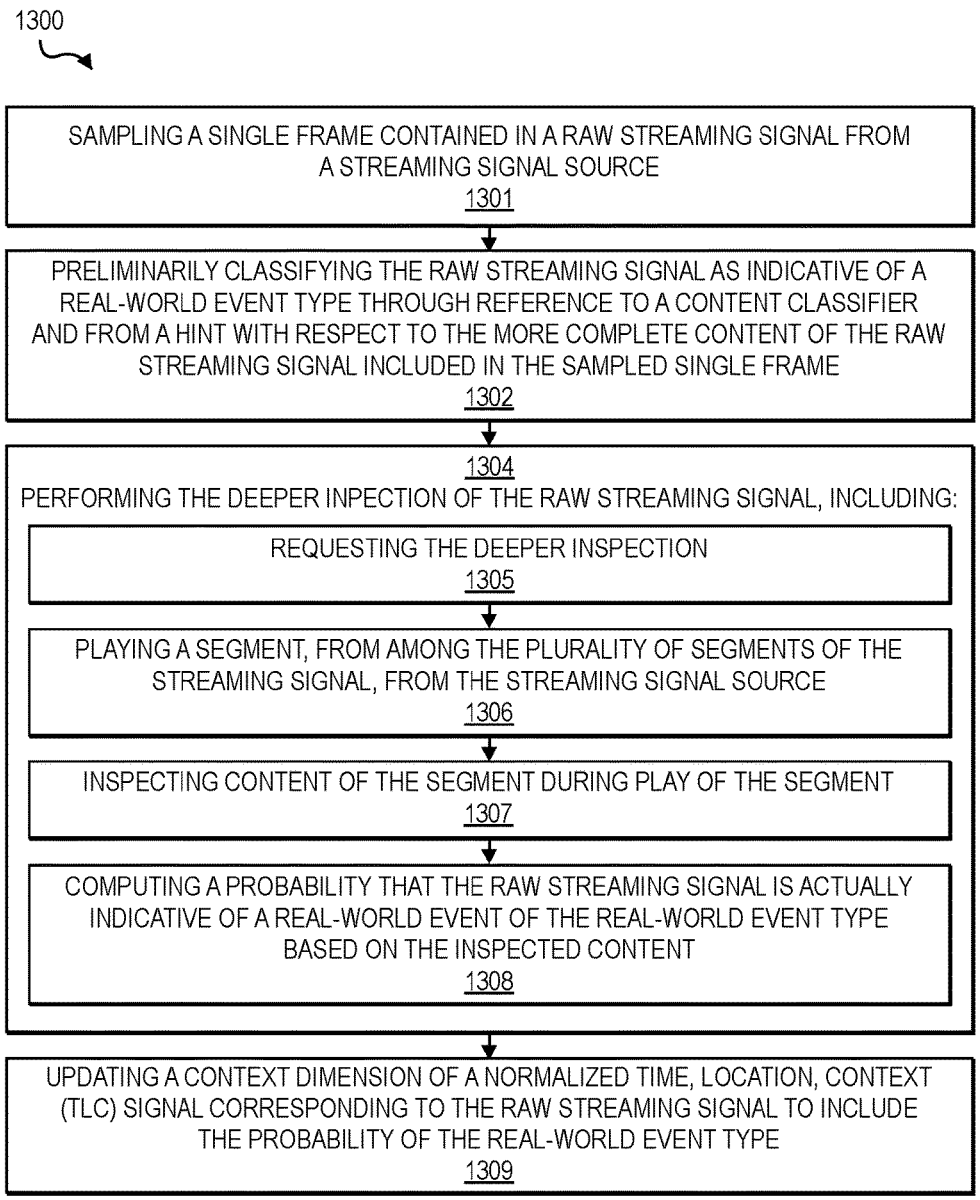
FIG. 13 illustrates a flow chart of an example method for ingesting a streaming signal.

FIG. 13 illustrates a flow chart of an example method 1300 for ingesting a streaming signal. Method 1300 will be described when respect to the components and data in FIG. 12.

Method 1300 includes sampling a single frame contained in a raw streaming signal from a streaming signal source (1301). For example, streams listener 701 can ingest raw streaming signal 1221. Raw streaming signal 1221 can originate from streaming signal source 1273. Raw streaming signal 1221 can be any of the described types of streaming signal and can be in a packet, segment, or analog format. Streams listener 701 may convert raw streaming signal 1221 for compatibility with other components of signal ingestion modules 101. Raw streaming signal 1221 can be a live streaming single or replayed streaming signal.

Frame sampler 702 can sample one or more data frames 1212 from streaming signal 1221. Frame sampler 702 can send data frames 1212 to signal processing modules 704.

Method 1300 includes preliminarily classifying the raw streaming signal as indicative of a real-world event type through reference to a content classifier and from a hint with respect to the more complete content of the raw streaming signal included in the sampled single frame (1302). For example, signal processing modules 704 can send data frames 1212 to content classifier 708. Content classifier 708 can preliminarily classify streaming signal as possible event type 1218 based on data frames 1212. Content classifier 708 can return possible event type 1218 (i.e., a hint with respect to streaming signal 1221 indicting an event) to signal processing modules 704.

Method 1300 includes triggering a deeper inspection of the raw streaming signal based on the preliminary classification (1303). For example, in response to receiving possible event type 1218, signal processing modules 704 can trigger deep inspection request 1214 to stream player/segmenter 1207.

Method 1300 includes performing the deeper inspection of the raw streaming signal (1304). For example, content classifier 708 can perform a deeper inspection of streaming signal 1221. Performing the deeper inspection of the raw streaming signal can include, requesting the deeper inspection (1305). For example, signal processing modules 704 can send deep inspection request 1214 to stream player/segmenter 1207.

Performing the deeper inspection of the raw streaming signal includes playing a portion of the raw streaming signal from the streaming signal source (1306). For example, stream player/segmenter 1207 can send replay request 1213 to streaming single source 1273. In response to receiving replay request 1213, streaming signal source 1273 can send streaming signal replay 1216 (a portion of streaming signal 1221) to stream player/segmenter 1207. Stream player/segmenter 1207 can play segments 1217 (of streaming signal replay 1216) and send metadata 1247 to content classifier 708.

In one aspect, streaming signal source 1273 buffers content for some amount of time, for example, up to 10 minutes. Stream player/segmenter 1207 can request replay of buffered content from streaming signal source 1273.

Performing the deeper inspection of the raw streaming signal includes inspecting the content of the segment during play of the segment (1307). Performing the deeper inspection of the raw streaming signal includes computing a probability that the raw streaming signal is actually indicative of a real-world event of the real-world event type (1308). For example, content classifier 708 can inspect segments 1217 (possibly in combination with metadata 1247) to compute a probability that streaming signal 1221 is actually indicative of a real-world event of possible event type 1218. Content classifier 708 can inspect segments 1217 (possibly in combination with metadata 747) during play. Content classifier 708 can confirm possible event type 1218 as event type 1219 (i.e., possible event type 1218 and event type 1219 can indicate the same type of event). Content classifier 708 can send event type 1219 to signal processing modules 704.

Method 1300 includes updating a context dimension of a normalized Time, Location, Context (TLC) signal corresponding to the raw streaming signal to include the probability of the real-world event type (1309). For example, signal processing modules 704 can determine context 1226 for streaming signal 1221. More generally, signal processing modules 704 can formulate normalized media signal 1222, including time dimension 1223, location dimension 1224, context dimension 1226 (including event type 1219) and segments 1217. Signal processing modules 704 can send normalized media signal 1222 to event detection infrastructure 103. For example, normalized media signal 1222 can be included in normalized signals 122. Event detection infrastructure 103 can use normalized media signal 1322 (possibly in combination with other normalized signals) to detect an event.

In one aspect, streaming signal source 1221 is an A/V stream and data frames 1212 are images from the A/V stream. In response to data frames 1212 including evidence of an event, stream player/segment 1207 can request replay of buffered parts of the A/V stream to confirm or deny the event.

Methods similar to method 1300 can also be used to determine actual severity.

Inspecting A Different Streaming Signal

Figure 14:
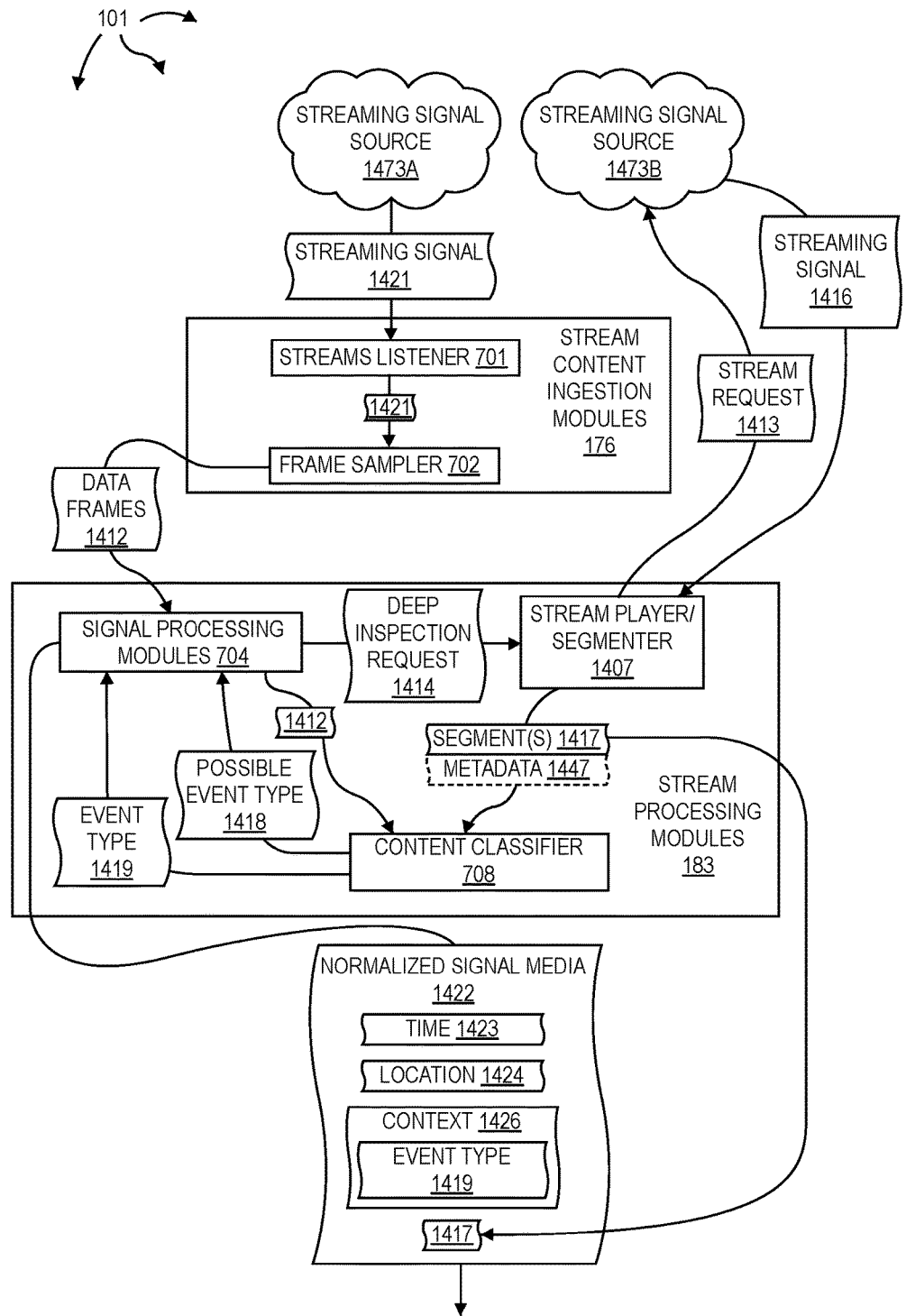
FIG. 14 illustrates an example arrangement of components that can be included in signal ingestion modules to ingest streaming signals.

FIG. 14 illustrates an example arrangement of components that can be included in signal ingestion modules 101 to ingest streaming signals. The arrangement of components in FIG. 14 is similar to the arrangement of components in FIG. 12. Stream player/segmenter 1407 is similar to stream player/segmenter 1207. Stream player/segmenter 1407 can be further configured to request a streaming signal from a streaming signal source other than a streaming signal source used to trigger a deep inspection request.

Stream player/segmenter 1407 can ingest raw streaming signals by sampling raw streaming signals at a specified sampling frequency. When a possible event is not detected or when a possible event is not confirmed, Stream player/segmenter 1407 can reduce the sampling frequency (i.e., throttle down) or can stop sampling. Reducing sampling frequency or stopping sampling conserves computing and network resources.

Subsequently, a possible event can be detected from further portions of one raw streaming signal sampled at the reduced sampling frequency. In response to a detected possible event, stream player/segmenter 1207 can increase the sampling frequency (e.g., throttle up) of another raw streaming signal.

Figure 15:
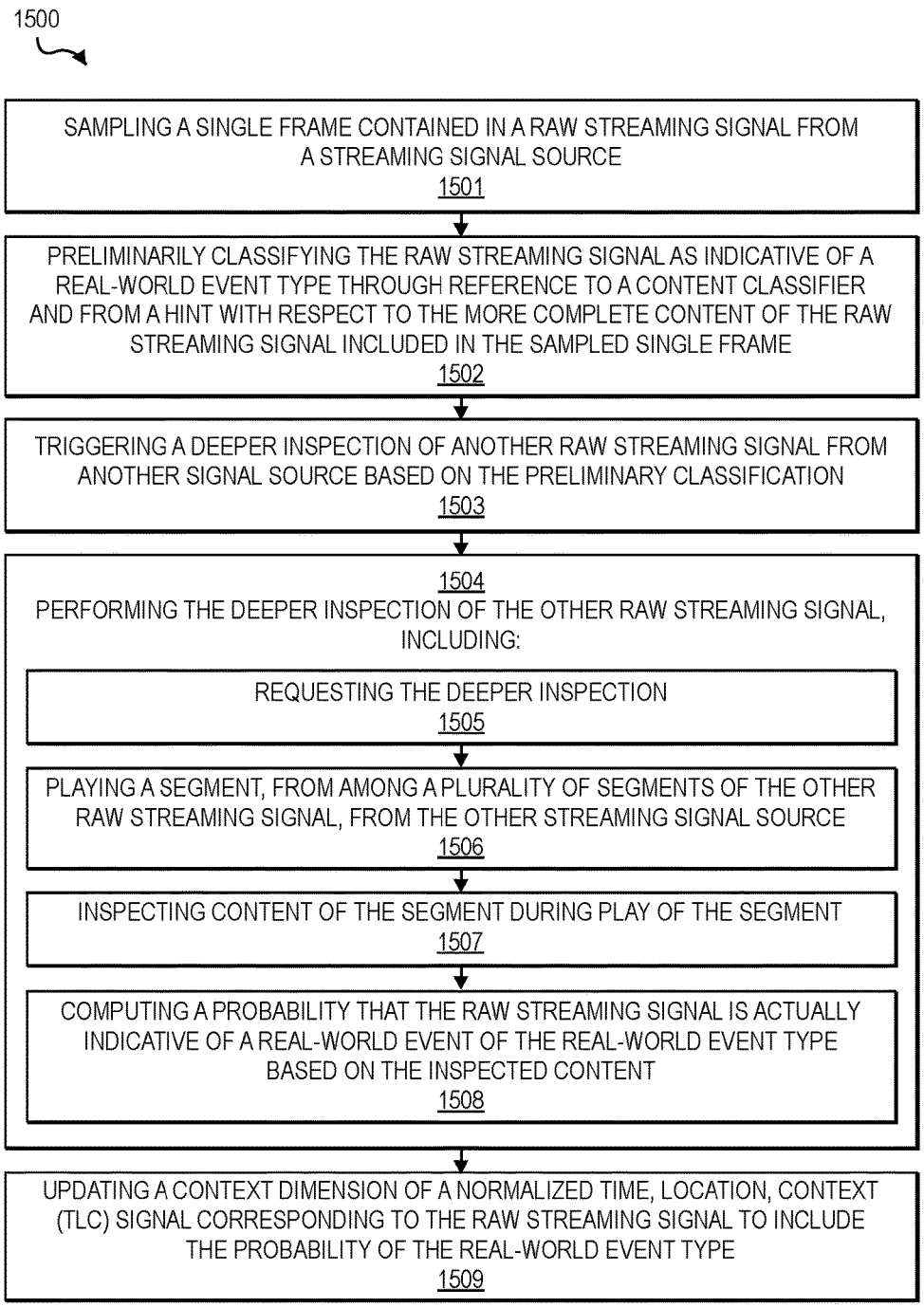
FIG. 15 illustrates a flow chart of an example method for ingesting streaming signals.

FIG. 15 illustrates a flow chart of an example method 1500 for ingesting streaming signals. Method 1500 will be described when respect to the components and data in FIG. 14.

Method 1500 includes sampling a single frame contained in a raw streaming signal from a streaming signal source (1501). For example, streams listener 701 can ingest raw streaming signal 1421. Raw streaming signal 1421 can originate from streaming signal source 1473A. Raw streaming signal 1421 can be any of the described types of streaming signal and can be in a packet, segment, or analog format. Streams listener 701 may convert raw streaming signal 1421 for compatibility with other components of signal ingestion modules 101. Raw streaming signal 1021 can be a live streaming single or replayed streaming signal.

Frame sampler 702 can sample one or more data frames 1412 from streaming signal 1421. Frame sampler 702 can send data frames 1412 to signal processing modules 704.

Method 1500 includes preliminarily classifying the raw streaming signal as indicative of a real-world event type through reference to a content classifier and from a hint with respect to the more complete content of the raw streaming signal included in the sampled single frame (1502). For example, signal processing modules 704 can send data frames 1412 to content classifier 708. Content classifier 708 can preliminarily classify streaming signal as possible event type 1418 based on data frames 1412. Content classifier 708 can return possible event type 1418 (i.e., a hint with respect to streaming signal 1421 indicting an event) to signal processing modules 704.

Method 1500 includes triggering a deeper inspection of another raw streaming signal based on the preliminary classification (1503). For example, in response to receiving possible event type 1418, signal processing modules 704 can trigger deep inspection request 1414 to stream player/segmenter 1207. In one aspect, deep inspection request 1414 specifically identifies streaming signal source 1473B.

Method 1500 includes performing the deeper inspection of the other raw streaming signal (1504). For example, content classifier 708 can perform a deeper inspection of streaming signal 1416. Performing the deeper inspection of the other raw signal includes requesting the deeper inspection (1505). For example, signal processing modules 704 can send deep inspection request 1414 to stream player/segmenter 1407.

Performing the deeper inspection of the other raw signal includes playing a segment, from among a plurality of segments of the other raw streaming signal, from the other streaming signal source (1506). For example, stream player/segmenter 1407 can send stream request 1413 to streaming single source 1473B. In response to receiving stream request 1413, streaming signal source 1473B can send streaming signal 1416 to stream player/segmenter 1407. Stream player/segmenter 1407 can play segments 1417 (of streaming signal 1416) and send metadata 1447 to content classifier 708.

Performing the deeper inspection of the other raw signal includes inspecting content of the segment during replay of the segment (1507). Performing the deeper inspection of the other raw signal includes computing a probability that the raw streaming signal is actually indicative of a real-world event of the real-world event type based on the inspected content (1508). For example, content classifier 708 can inspect segments 1417 (possibly in combination with metadata 1447) to compute a probability that streaming signal 1421 is actually indicative of a real-world event of possible event type 1418. Content classifier 708 can inspect segments 1417 (possibly in combination with metadata 747) during play. Content classifier 708 can confirm possible event type 1418 as event type 1419 (i.e., possible event type 1418 and event type 1419 can indicate the same type of event). Content classifier 708 can send event type 1419 to signal processing modules 704.

Method 1500 includes updating a context dimension of a normalized Time, Location, Context (TLC) signal corresponding to the raw streaming signal to include the probability of the real-world event type (1509). For example, signal processing modules 704 can determine context 1426 for streaming signal 1421. More generally, signal processing modules 704 can formulate normalized media signal 1422, including time dimension 1423, location dimension 1424, context dimension 1426 (including event type 1419) and segments 1417. Signal processing modules 704 can send normalized media signal 1422 to event detection infrastructure 103. For example, normalized media signal 1422 can be included in normalized signals 122. Event detection infrastructure 103 can use normalized media signal 1422 (possibly in combination with other normalized signals) to detect an event.

In one aspect, streaming signal sources 1473A and 1473B stream different types of signals. For example, streaming signal source 1473A can stream AVL data or some type of telemetry and streaming source 1473B can stream audio/video data. As such, as preliminary indication of an event from one streaming signal type can be configured through reference to another, different streaming signal type.

Methods similar to method 1500 can also be used to determine actual severity.

In general, referring back to FIGS. 3A-3C, signal aggregator 308 can concurrently handle a plurality of signals, including streaming signals, in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 308 acting as an "air traffic controller" of live data. Signals from multiple sources of data can be aggregated and normalized for a common purpose (e.g., of event detection). Data ingestion, event detection, and event notification can process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
concurrently during ingestion of a raw streaming signal from a streaming signal source:
sampling a single frame contained in the raw streaming signal;
separating the raw streaming signal into a plurality of segments; and
storing the plurality of segments at a storage device;
computing a preliminarily severity of a possible real-world event of a real-world event type from a hint with respect to the more complete content of the raw streaming signal included in the sampled single frame;
triggering a deeper inspection of the raw streaming signal based on the preliminary severity;
performing the deeper inspection of the raw streaming signal, including:
requesting the deeper inspection;
playing a segment, from among the plurality of segments, from the storage device;
inspecting the content of the segment during play of the segment;
computing an actual severity of the real-world event of the real-world event type based on the preliminary severity and the inspected content; and
updating a normalized Time, Location, Context (TLC) signal corresponding to the raw streaming signal to include the actual severity.

2. The method of claim 1, further comprising ingesting the raw streaming signal that includes one or more of: metadata automatic vehicle location (AVL) data, Internet of Things (IoT) data, drone telemetry, Federal Aviation Association (FAA) telemetry, satellite telemetry, radar data, or water level data.

3. The method of claim 1, wherein sampling the single frame comprises sampling the raw streaming signal in accordance with a sampling frequency.

4. The method of claim 1, wherein storing the plurality of segments at a storage device comprises storing the plurality of segments at a storage device configured to provide multi consumer access by time and range indexing.

5. The method of claim 1, wherein playing a segment comprises feeding the segment to a severity computation module.

6. The method of claim 1, further comprising normalizing the raw streaming signal into the Time, Location, Context (TLC) signal, including:
determining a time associated with the streaming signal;
determining a location associated with the streaming signal; and
including the time, the location, the actual severity, and the plurality of segments in the Time, Location, Context (TLC) signal; and
further comprising sending the Time, Location, Context (TLC) signal to an event detection infrastructure.

7. The method of claim 1, wherein computing a preliminarily severity comprises computing a preliminarily severity based on metadata associated with the raw streaming signal.

8. A method comprising:
sampling a single frame contained in a raw streaming signal from a streaming signal source;
preliminarily classifying the raw streaming signal as indicative of a real-world event type through reference to a content classifier and from a hint with respect to the more complete content of the raw streaming signal included in the sampled single frame;

triggering a deeper inspection of the raw streaming signal based on the preliminary classification;

performing the deeper inspection of the raw streaming signal, including:
  requesting the deeper inspection;
  playing a portion of the raw streaming signal from the streaming signal source;
  inspecting the content of the portion during play of the portion; and
  computing a probability that the raw streaming signal is actually indicative of the real-world event type; and updating a context dimension of a normalized Time, Location, Context (TLC) signal corresponding to the raw streaming signal to include the probability of the real-world event type.

9. The method of claim 8, further comprising ingesting the raw streaming signal that includes one or more of: metadata automatic vehicle location (AVL) data, Internet of Things (IoT) data, drone telemetry, Federal Aviation Association (FAA) telemetry, satellite telemetry, radar data, or water level data.

10. The method of claim 8, wherein playing the portion comprises feeding the to the content classifier.

11. The method of claim 8, further comprising:
receiving a context annotation from the content classifier; and
looking up a classification tag corresponding to the context annotation.

12. The method of claim 11, further comprising normalizing the raw streaming signal into the Time, Location, Context (TLC) signal, including:
determining a time associated with the streaming signal;
determining a location associated with the streaming signal; and
including the time, the location, the classification tag, and the plurality of segments in the Time, Location, Context (TLC) signal; and
further comprising sending the Time, Location, Context (TLC) signal to an event detection infrastructure.

13. The method of claim 8, wherein preliminarily classifying the raw streaming signal as indicative of a real-world event type comprises preliminarily classifying the raw streaming signal based on metadata associated with the raw streaming signal.

14. A method comprising:
sampling a single frame contained in a first raw streaming signal from a streaming signal source;
preliminarily classifying the first raw streaming signal as indicative of a real-world event type through reference to a content classifier and from a hint with respect to the more complete content of the first raw streaming signal included in the sampled single frame;

triggering a deeper inspection of a second raw signal based on the preliminary classification;

performing the deeper inspection of the second raw signal, including:
  requesting the deeper inspection;
  playing a segment from among a plurality of segments of the second raw streaming signal;
  inspecting content of the segment during replay of the segment; and
  computing a probability that the first raw streaming signal is actually indicative of a real-world event of the real-world event type based on the inspected content; and updating a context dimension of a normalized Time, Location, Context (TLC) signal corresponding to the first raw streaming signal to include the probability of the real-world event type.

15. The method of claim 14, further comprising ingesting the first raw streaming signal that includes one or more of: metadata, automatic vehicle location (AVL) data, Internet of Things (IoT) data, drone telemetry, Federal Aviation Association (FAA) telemetry, satellite telemetry, radar data, or water level data.

16. The method claim 15, wherein performing the deeper inspection of the second raw signal comprises performing a deeper inspection of the second raw streaming signal that includes a different one or more of: metadata, automatic vehicle location (AVL) data, Internet of Things (IoT) data, drone telemetry, Federal Aviation Association (FAA) telemetry, satellite telemetry, radar data, or water level data.

17. The method of claim 15, wherein performing the deeper inspection of the second raw signal comprises performing a deeper inspection of the second raw streaming signal that includes one or more of: audio data or video data.

18. The method of claim 14, wherein playing a segment comprises feeding the segment to the content classifier.

19. The method of claim 14, further comprising:
receiving a context annotation from the content classifier; and
looking up a classification tag corresponding to the context annotation.

20. The method of claim 14, wherein computing a probability that the first raw streaming signal is actually indicative of a real-world event of the real-world event type comprises computing the probability based on metadata associated with the second raw streaming signal.

* * * * *